(12) United States Patent
Kodama

(10) Patent No.: US 12,177,394 B2
(45) Date of Patent: Dec. 24, 2024

(54) IMAGE FORMING APPARATUS AND CONTROL METHOD

(71) Applicant: SHARP KABUSHIKI KAISHA, Sakai (JP)

(72) Inventor: Hirotaka Kodama, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/991,752

(22) Filed: Nov. 21, 2022

(65) Prior Publication Data

US 2023/0171356 A1  Jun. 1, 2023

(30) Foreign Application Priority Data

Nov. 26, 2021 (JP) ................. 2021-192387

(51) Int. Cl.
*H04N 1/00* (2006.01)
*G06F 21/31* (2013.01)

(52) U.S. Cl.
CPC ......... *H04N 1/00514* (2013.01); *G06F 21/31* (2013.01); *H04N 1/00506* (2013.01)

(58) Field of Classification Search
CPC . G06F 21/31; H04N 1/00506; H04N 1/00514
See application file for complete search history.

(56) References Cited

U.S. PATENT DOCUMENTS

| | | | | |
|---|---|---|---|---|
| 10,140,070 B2* | 11/2018 | Yasuda | ................. | H04N 1/0035 |
| 2008/0141167 A1* | 6/2008 | Kubo | ................. | H04N 1/00514 |
| | | | | 711/155 |
| 2012/0054561 A1* | 3/2012 | Yamaguchi | ........... | G06F 11/327 |
| | | | | 714/57 |
| 2014/0026209 A1* | 1/2014 | Asahara | ................ | G06F 21/608 |
| | | | | 726/16 |
| 2015/0085096 A1* | 3/2015 | Smits | ..................... | H04N 23/57 |
| | | | | 348/78 |
| 2016/0011706 A1* | 1/2016 | Horiike | .............. | H04N 1/00514 |
| | | | | 345/173 |
| 2016/0295034 A1* | 10/2016 | Miyazawa | ......... | H04N 1/00411 |
| 2017/0013170 A1* | 1/2017 | Sato | ..................... | H04N 1/4413 |
| 2017/0192727 A1* | 7/2017 | Yun | ....................... | G06F 3/1276 |
| 2017/0331965 A1* | 11/2017 | Ikeda | .................... | G06F 3/1238 |
| 2018/0081599 A1* | 3/2018 | Yamada | ................ | G06F 3/1239 |
| 2018/0239569 A1* | 8/2018 | Tomihisa | .............. | G06F 3/1267 |
| 2019/0004751 A1 | 1/2019 | Ikeda et al. | | |
| 2019/0310809 A1* | 10/2019 | Sekine | .................. | G06F 3/1235 |
| 2020/0068080 A1* | 2/2020 | Kawabata | .......... | H04N 1/00514 |

(Continued)

FOREIGN PATENT DOCUMENTS

JP       2019-010863 A     1/2019

*Primary Examiner* — Justin S Lee

(74) *Attorney, Agent, or Firm* — ScienBiziP, P.C.

(57) ABSTRACT

An image forming apparatus includes a displayer, a controller, and an image former. The controller is capable of setting a screen to be displayed on the displayer, as an initial screen, and is capable of making settings as to whether a specific screen for displaying apparatus information is displayed on the displayer in preference to the initial screen. In a case where settings are made to display the specific screen on the displayer in preference to the initial screen, the controller displays the specific screen on the displayer in preference to the initial screen.

11 Claims, 26 Drawing Sheets

(56) References Cited

U.S. PATENT DOCUMENTS

| | | | |
|---|---|---|---|
| 2020/0249891 A1* | 8/2020 | Kawakami | G06F 3/1273 |
| 2021/0279022 A1* | 9/2021 | Kaneda | G06F 3/1205 |
| 2022/0014639 A1* | 1/2022 | Omori | H04N 1/00427 |
| 2022/0137901 A1* | 5/2022 | Kobashi | G06F 3/1256 |
| | | | 358/1.14 |

* cited by examiner

FIG. 3

| SETTING ITEM NAME | SETTING VALUE | |
|---|---|---|
| DEFAULT DISPLAY SCREEN | HOME SCREEN | ～D100 |
| PRIORITY DISPLAY OF SYSTEM INFORMATION SCREEN | OFF | ～D102 |
| DISPLAY PERMISSION OF SYSTEM INFORMATION SCREEN BEFORE LOGIN | OFF | ～D104 |
| IP ADDRESS | 10. 36. 159. 104 | |
| Wi-Fi Direct | ON | |
| REMOTE OPERATION | ON | |
| SIZE OF PAPER FEED TRAY 1 | A4 | |
| PAPER TYPE OF PAPER FEED TRAY 1 | PLAIN PAPER 1 | |
| ⋮ | ⋮ | |

FIG. 4

|  |  | PRIORITY DISPLAY OF SYSTEM INFORMATION SCREEN | |
|---|---|---|---|
|  | SETTING VALUE | OFF | ON |
| DISPLAY PERMISSION OF SYSTEM INFORMATION SCREEN BEFORE LOGIN | OFF | (A) SECURITY FIRST PRIORITY MODE | (B) SECURITY PRIORITY MODE |
|  | ON | (C) CONVENIENCE PRIORITY MODE | (D) CONVENIENCE FIRST PRIORITY MODE |

FIG. 5

| MESSAGE ID | MESSAGE |
|---|---|
| 1 | TONER HAS RUN OUT. |
| 2 | NOT CONNECTED TO NETWORK.<br>CHECK CONNECTION OF LAN CABLE. |
| 3 | CHECK ERROR OF IMAGE JOB LOG.<br>(DISPLAY IMAGE JOB LOG WHEN SELECTING) |
| ⋮ | ⋮ |

FIG. 6

| ITEM NAME | ITEM VALUE |
|---|---|
| TONER REMAINING AMOUNT(Bk) | 100% |
| TONER REMAINING AMOUNT(C) | 50% |
| TONER REMAINING AMOUNT(M) | 30% |
| TONER REMAINING AMOUNT(Y) | 0% |
| PAPER REMAINING AMOUNT OF PAPER FEED TRAY 1 | 90% |
| ⋮ | ⋮ |

FIG. 12

FIG. 13
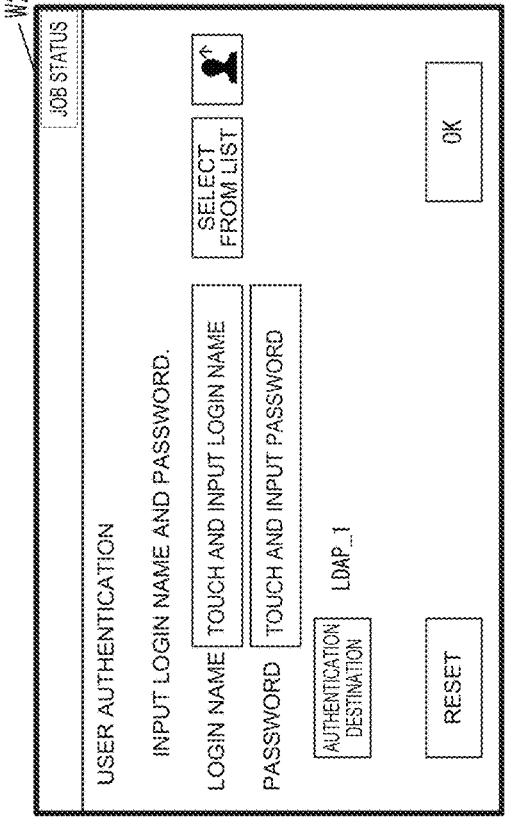
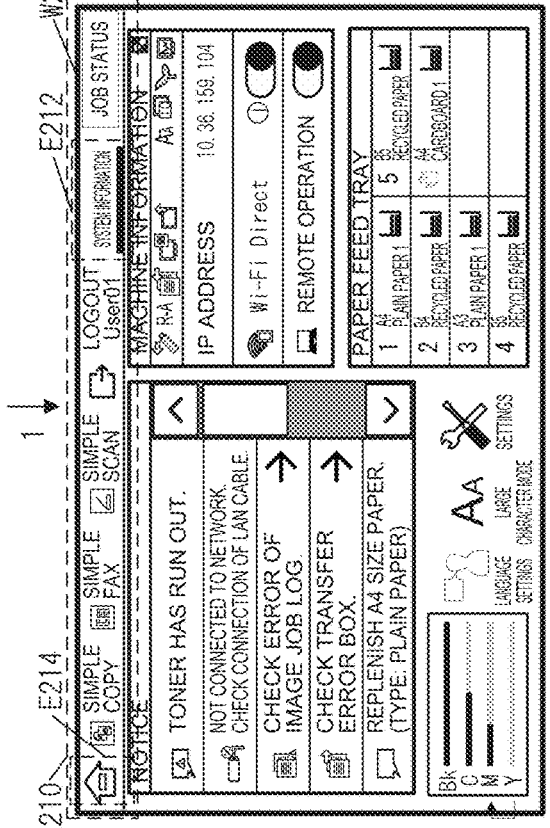
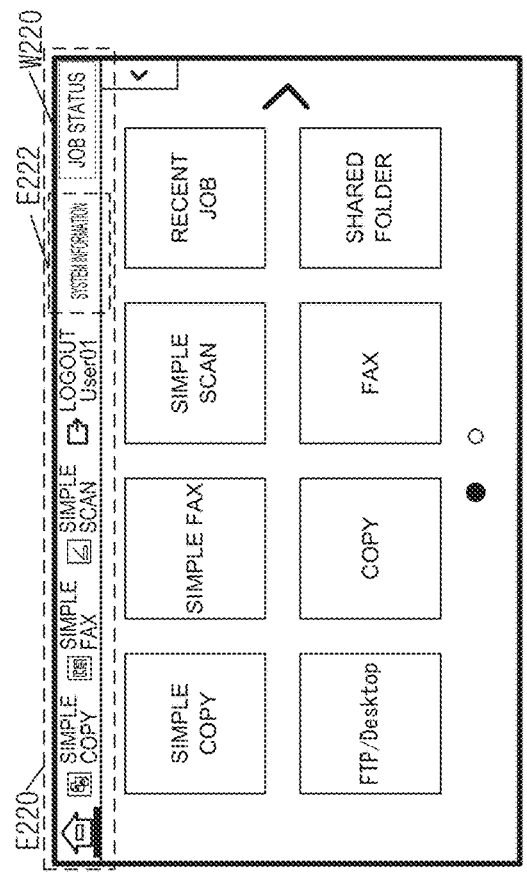

FIG. 16

| MESSAGE ID | MESSAGE TYPE | PRE-LOGIN MESSAGE | POST-LOGIN MESSAGE | DATE AND TIME |
|---|---|---|---|---|
| 1 | IN-HOUSE NOTIFICATION | MEDICAL EXAMINATION IS CARRIED OUT FROM NOVEMBER 1, 2011.<br><br>([PRINT] BUTTON IS NOT DISPLAYED) | MEDICAL EXAMINATION IS CARRIED OUT FROM NOVEMBER 1, 2021.PRINT MEDICAL EXAMINATION SHEET, AND BRING IT WHEN YOU GO FOR EXAMINATION.<br><br>([PRINT] BUTTON IS DISPLAYED) | OCTOBER 6, 2021 14:24:21 |
| 2 | IN-HOUSE NOTIFICATION | NEW SERVICE IS STARTED TO BE PROVIDED FROM JANUARY 2022.<br><br>([APPLICATION] BUTTON IS NOT DISPLAYED) | NEW SERVICE IS STARTED TO BE PROVIDED FROM JANUARY 2022.IF YOU WISH TO USE NEW SERVICE, MAKE APPLICATION.<br><br>([APPLICATION] BUTTON IS DISPLAYED) | OCTOBER 6, 2021 18:14:24 |
| 3 | EXTERNAL NOTIFICATION | NEW VERSION FIRMWARE IS AVAILABLE.<br><br>([EXECUTE DOWNLOAD] BUTTON IS NOT DISPLAYED) | NEW VERSION FIRMWARE IS AVAILABLE. PLEASE UPDATE.<br><br>([EXECUTE DOWNLOAD] BUTTON IS DISPLAYED) | OCTOBER 7, 2021 09:00:00 |
| 4 | EXTERNAL NOTIFICATION | MEMORY REMAINING AMOUNT OF FAX RECEIPT DATA IS DECREASING.<br><br>([DETAIL] BUTTON IS NOT DISPLAYED) | MEMORY REMAINING AMOUNT OF FAX RECEIPT DATA IS DECREASING.CHECK DETAILS, AND DELETE UNNECESSARY DATA.<br><br>([DETAIL] BUTTON IS DISPLAYED) | OCTOBER 7, 2021 11:54:04 |
| 5 | NOTIFICATION FROM MFP | THERE ARE UNCHECKED RECEIPT DATA.<br><br>([CHECK] BUTTON IS NOT DISPLAYED) | THERE ARE UNCHECKED RECEIPT DATA. CHECK DETAILS.<br><br>([CHECK] BUTTON IS DISPLAYED) | OCTOBER 7, 2021 13:44:38 |
| ⋮ | ⋮ | ⋮ | ⋮ | ⋮ |

FIG. 17

| ITEM NAME | ITEM VALUE | |
|---|---|---|
| TONER REMAINING AMOUNT(Bk) | 100% | |
| TONER REMAINING AMOUNT(C) | 50% | |
| TONER REMAINING AMOUNT(M) | 30% | |
| TONER REMAINING AMOUNT(Y) | 0% | |
| PAPER REMAINING AMOUNT OF PAPER FEED TRAY 1 | 90% | |
| ⋮ | ⋮ | |
| LATEST LOGOUT DATE AND TIME | OCTOBER 7, 2021 13:10:12 | D500 |
| IP ADDRESS CHANGE FLAG | No | D502 |
| PAPER FEED TRAY CHANGE FLAG | No | D504 |
| ⋮ | ⋮ | |

FIG. 23

| SETTING ITEM NAME | SETTING VALUE |
|---|---|
| PRIORITY DISPLAY OF SYSTEM INFORMATION SCREEN | OFF |
| DISPLAY PERMISSION OF SYSTEM INFORMATION SCREEN BEFORE LOGIN | OFF |
| DEFAULT DISPLAY SCREEN | HOME SCREEN |
| IP ADDRESS | 10. 36. 159. 104 |
| Wi-Fi Direct | ON |
| REMOTE OPERATION | ON |
| SIZE OF PAPER FEED TRAY 1 | A4 |
| PAPER TYPE OF PAPER FEED TRAY 1 | PLAIN PAPER 1 |
| SWITCHING THRESHOLD VALUE | TWENTY TIMES OR MORE PER WEEK |
| ⋮ | ⋮ |

D700

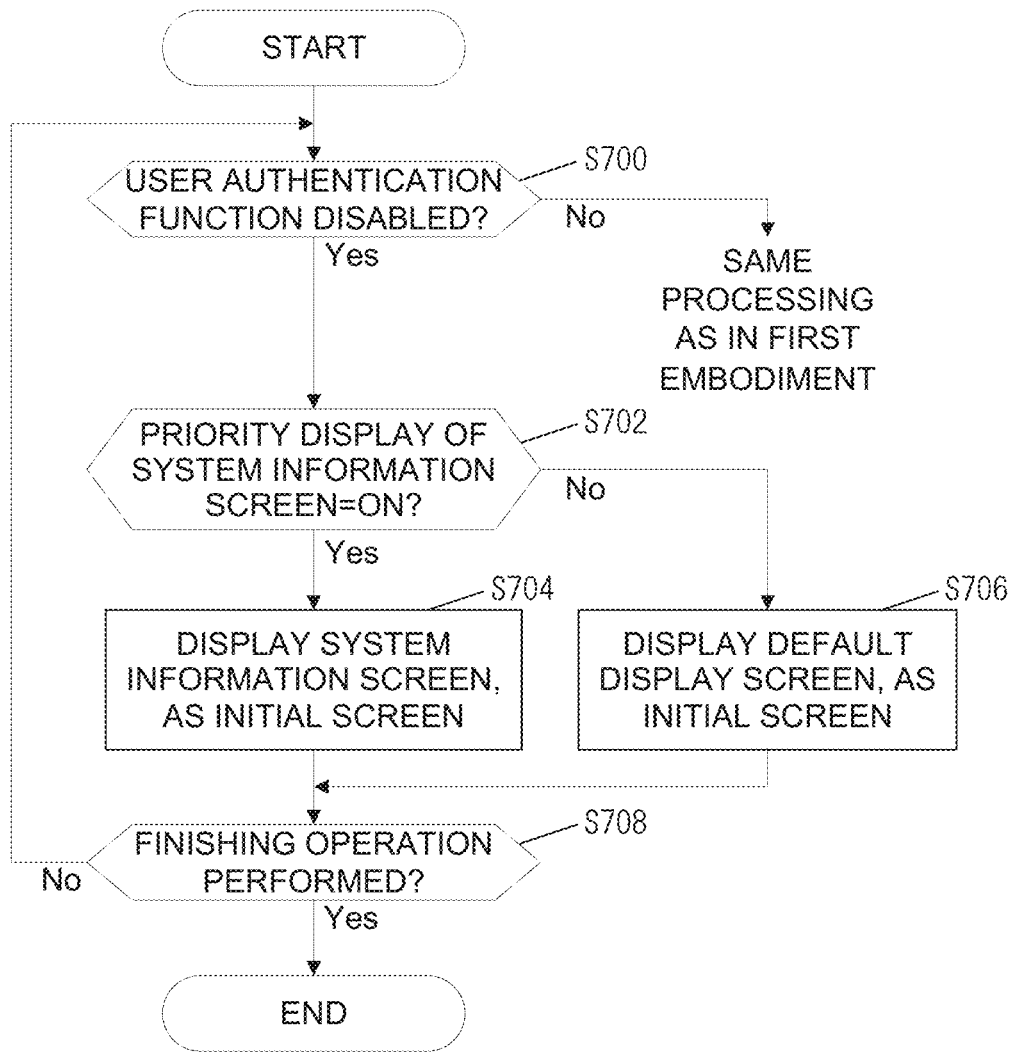

IMAGE FORMING APPARATUS AND CONTROL METHOD

BACKGROUND OF THE INVENTION

Field of the Invention

The present disclosure relates to an image forming apparatus and the like.

Description of the Background Art

Conventionally, image forming apparatuses such as multifunctional machines have been widely used. Further, techniques for controlling a timing of displaying a specific screen have also been proposed in image forming apparatuses.

For example, a technique for controlling a timing of displaying a Web content according to settings pertaining to a timing of displaying a user authentication screen, and settings pertaining to a timing of displaying the Web content is known.

Some image forming apparatuses display information on an image forming apparatus, such as a status and a setting content of the image forming apparatus in response to a display instruction by a user. However, as exemplified by a screen for displaying information on an image forming apparatus, there is a problem that detailed display control according to an operational status of the user is not achieved with respect to a screen that requires a specific instruction by the user in displaying. The conventional art does not consider this problem.

In view of the above-described problem, an object of the present disclosure is to provide an image forming apparatus and the like capable of controlling display of a screen that requires a specific instruction by a user when displaying according to an operational status of the user.

SUMMARY OF THE INVENTION

To solve the above-described problem, an image forming apparatus according to the present disclosure includes a displayer, a controller, and an image former. The controller is capable of setting a screen to be displayed on the displayer, as an initial screen, and is capable of making settings as to whether a specific screen for displaying apparatus information is displayed on the displayer in preference to the initial screen. In a case where settings are made in which the specific screen is displayed on the displayer in preference to the initial screen, the controller displays the specific screen on the displayer in preference to the initial screen.

Further, a control method according to the present disclosure is a control method for an image forming apparatus including: setting a screen to be displayed as an initial screen; making settings as to whether a specific screen for displaying apparatus on the apparatus in preference to the initial screen; and in a case where settings are made to display the specific screen on the displayer in preference to the initial screen, displaying the specific screen in preference to the initial screen.

According to the present disclosure, it is possible to provide an image forming apparatus and the like capable of controlling display of a screen that requires a specific instruction by a user when displaying according to an operational status of the user.

BRIEF DESCRIPTION OF THE DRAWINGS

FIG. 3 is a table illustrating a data structure of setting information according to the first embodiment.

FIG. 4 is a table illustrating screen transition modes according to the first embodiment.

FIG. 5 is a table illustrating a data structure of message information according to the first embodiment.

FIG. 6 is a table illustrating a data structure of apparatus information according to the first embodiment.

FIG. 12 is a diagram illustrating screen transition of the security first priority mode according to the first embodiment.

FIG. 13 is a diagram illustrating screen transition of the security priority mode according to the first embodiment.

FIG. 16 is a table illustrating a data structure of message information according to a second embodiment.

FIG. 17 is a table illustrating a data structure of apparatus information according to the second embodiment.

FIG. 23 is a table illustrating a data structure of setting information according to the fourth embodiment.

FIG. 26 is a flowchart illustrating a flow of main processing of an image forming apparatus according to a sixth embodiment.

DESCRIPTION OF THE PREFERRED EMBODIMENTS

Hereinafter, embodiments for implementing the present disclosure are described with reference to the drawings. Note that, the following embodiments are an example for describing the present disclosure, and the technical scope of the invention described in the claims is not limited to the following description.

1. First Embodiment

First, a first embodiment is described. The first embodiment describes a case in which an image forming apparatus according to the present disclosure is applied to an image forming apparatus 10. The image forming apparatus 10 is a digital multifunctional machine (IFP; Multi-Functional Peripheral/Printer) having a print function, a copy function, a scan function, and other functions. The print function is a function of performing printing, based on data transmitted from another device. The copy function is a function of printing an image input via an image inputter 120 to be described later. The scan function is a function of storing, in a predetermined storage destination, an image input via the image inputter 120 to be described later. The storage destination of an image is a storage 160 to be described later, a network attached storage (NAS), a server (e.g., a cloud storage in a cloud) communicable with the image forming apparatus 10, and the like.

1.1 Functional Configuration

Figure 1:
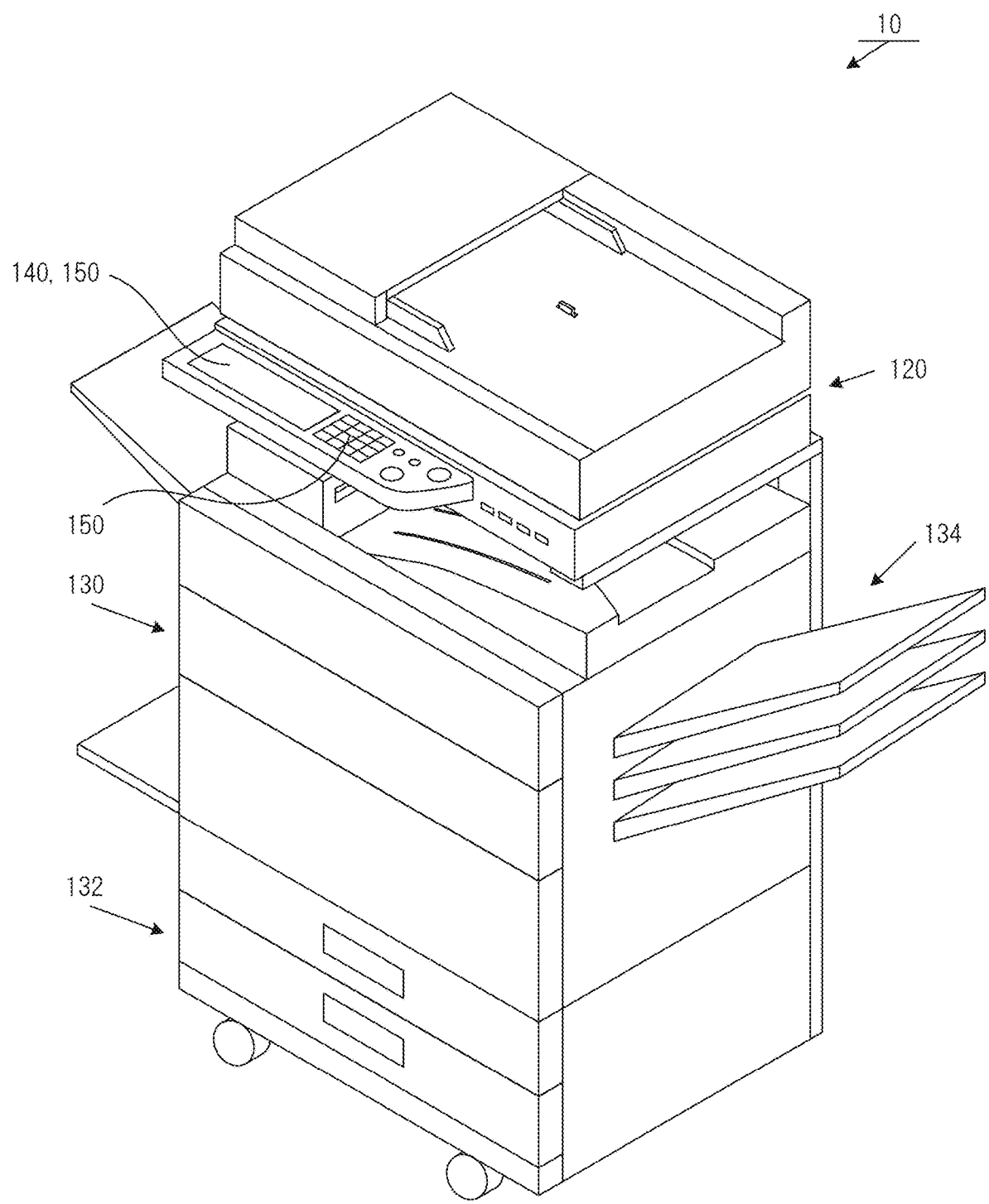
FIG. 1 is an external perspective view of an image forming apparatus according to a first embodiment.
Figure 2:
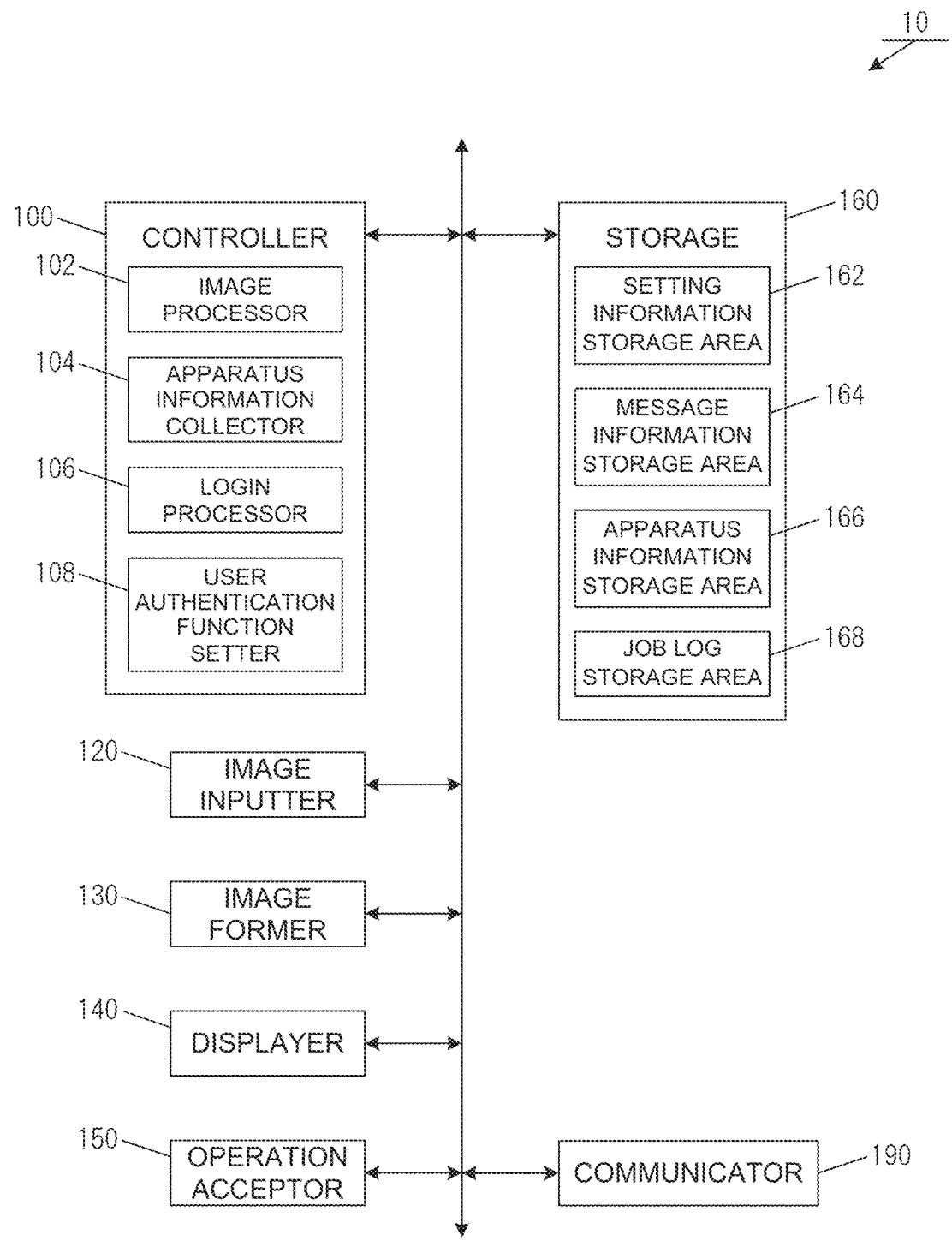
FIG. 2 is a diagram illustrating a functional configuration of the image forming apparatus according to the first embodiment.

Hereinafter, the first embodiment according to the present disclosure is described with reference to the drawings. FIG. 1 is an external perspective view of the image forming apparatus 10 according to the first embodiment. FIG. 2 is a block diagram illustrating a functional configuration of the image forming apparatus 10.

As illustrated in FIG. 2, the image forming apparatus 10 includes a controller 100, the image inputter 120, an image former 130, a displayer 140, an operation acceptor 150, the storage 160, and a communicator 190.

The controller 100 is a functional unit for controlling the entirety of the image forming apparatus 10. The controller 100 achieves various functions by reacting and executing various programs stored in the storage 160. For example, the controller 100 is configured of one or more arithmetic devices (central processing units (CPUs)) and the like. The controller 100 may also be configured as a system on a chip (SoC) having a plurality of functions among those described below.

The controller 100 functions as an image processor 102, an apparatus information collector 104, a login processor 106, and a user authentication function setter 108 by executing a program stored in the storage 160.

The image processor 102 performs processing related to various images. For example, the image processor 102 performs sharpening processing and gradation conversion processing with respect to an image input by the image inputter 120.

The apparatus information collector 104 performs processing of collecting information on the image forming apparatus 10, and storing the collected information in an apparatus information storage area 166, as apparatus information. The information on the image forming apparatus 10 is information indicating an operational status or a status of the image forming apparatus 10, and for example, is information such as a toner remaining amount of the image former 130, and information such as a paper remaining amount of a paper feed tray. Note that, the information on the image forming apparatus 10 may be information on the number of sheets of paper to be printed, a color printing rate, a power consumption amount, a power saving amount, and the like. The apparatus information collector 104 collects information on the image forming apparatus 10, and stores the apparatus information periodically or at a timing designated by the user.

The login processor 106 performs login processing. The login processing is processing of performing authentication of a user, and allowing login of the user. A function to be achieved by the login processor 106 is also referred to as a user authentication function.

Note that, the login processor 106 can use, as a method of authenticating a user, general authentication methods, such as knowledge authentication using an account name or a password, biometric authentication (such as fingerprint authentication, voice authentication, and face authentication), and belongings authentication using an ID card, a mobile terminal device, or the like. Information required for authentication (authentication information) is input by the user. Further, information to be collated with input authentication information may be stored in the storage 160, or may be stored in another device communicable via the communicator 190. In this case, in a case where input authentication information matches any piece of authentication information stored in advance, the login processor 106 authenticates the user associated with the authentication information, and allows the user to log in. Note that, the login processor 106 may perform authentication of the user by using a server or a service that performs authentication of the ser.

The user authentication function setter 108 sets whether to enable or disable the user authentication function (login processing). For example, the user authentication function setter 108 displays, on the displayer 140, a screen for accepting an operation of enabling or disabling the user authentication function according to a user operation, and enables or disables the user authentication function according to a user operation.

The image inputter 120 inputs image data to the image forming apparatus 10. For example, the image inputter 120 is configured of a scan device or the like that enables to generate image data by reading an image. The scan device converts an image into an electrical signal by an image sensor such as, for example, a charge coupled device (CCD) or a contact image sensor (CIS), and generates digital data by quantizing and encoding the electrical signal.

The image former 130 forms (prints) an image on a recording medium such as recording paper. The image former 130 is configured of, for example, a laser printer or the like using an electrophotographic method. The image former 130, for example, feeds recording paper from a paper feed tray 132 in FIG. 1, forms an image on a surface of the recording paper, and discharges the recording paper from a paper discharge tray 134.

The displayer 140 displays various pieces of information. The displayer 140 is configured of a display device such as, for example, a liquid crystal display (LCD), an organic electro-luminescence (EL) display, or a micro LED display.

The operation acceptor 150 accepts an operation of a user using the image forming apparatus 10, The operation acceptor 150 is configured of an input device such as a touch sensor. A method of detecting an input by a touch sensor may be a general detection method, such as, for example, a resistive film method, an infrared method, an electromagnetic induction method, or a capacitance method. Note that, the image forming apparatus 10 may include a touch panel in which the displayer 140 and the operation acceptor 150 are integrally formed.

The storage 160 stores various programs necessary for an operation of the image forming apparatus 10, and various pieces of data. The storage 160 is configured of a storage device such as, for example, a solid state drive (SSD) being a semiconductor memory, or a hard disk drive (HDD).

The storage 160 secures, as storage areas, a setting information storage area 162, a message information storage area 164, the apparatus information storage area 166, and a job log storage area 168.

The setting information storage area 162 stores information (setting information) in which an item name and a setting value are associated with each other for each item, regarding an item of settings related to an operation of the image forming apparatus 10. As illustrated in FIG. 3, the setting information includes, for example, a setting item name (e.g., a "default display screen"), and a setting value (e.g., a "home screen") for the item. As a setting value, for example, a value input by the user is stored via a screen (system setting screen) for performing settings of the image forming apparatus 10. In other words, a setting value (settings related to an operation of the image forming apparatus 10) to be stored in setting information can be changed by the user.

In the present embodiment, setting information related to an initial screen is included. The initial screen is a screen to be displayed on the displayer 140, when no operation has been performed ley the user for a certain period of time, when settings of a job are cleared (when settings of a job have not been performed at all), when the image forming apparatus 10 is started up, or the like.

The initial screen is, for example, a login screen in a case before login, and a home screen in a case after login. The login screen is a screen including an input field for information (authentication information) necessary for the user to log in, a button for accepting an operation (login operation) for performing login processing, and the like. Further, the home screen is a screen on which a button and other members for selecting a function to be achieved by the image forming apparatus 10 are arranged.

Herein, in the present embodiment, an initial screen after login is called a default display screen. It is assumed that the default display screen is selectable by the user, and settings on the default display screen selected by the user are stored as setting information (D100 in FIG. 3). The default display screen may be a home screen, or an operation screen for performing a job operation (e.g., a copy screen for executing a copy job, or a scan screen for executing a scan job).

In addition, in the present embodiment, setting information related to a system information screen (specific screen) is stored. The system information screen is a screen that displays information on the image forming apparatus 10 for each item. The information on the image forming apparatus 10 is, for example, information on a toner remaining amount, information related to the paper feed tray 132, information related to an error (error information, an error message), and the like. In other words, the system information screen is a screen that collects and displays information such as a system-related setting content of the image forming apparatus 10, and an operational status of the image forming apparatus 10, for each item. The system information screen is displayed in a case where a specific instruction or a specific operation for displaying a system information screen (e.g., an operation of selecting a button for displaying a system information screen) is given from a home screen or an operation screen to be displayed after login.

In the present embodiment, setting information on the following two setting items is stored as setting information related to a system information screen.

(1) Priority Display of System Information Screen (D102 in FIG. 3)

Priority display of a system information screen is a setting item indicating whether a system information screen is preferentially displayed as an initial screen. Either "OFF" (disabled) or "ON" (enabled) is stored as a setting value. Note that, it is assumed that, in a case where a setting value for priority display of a system information screen is "ON", a default display screen is displayed after the system information screen is closed.

(2) Display Permission of System Information Screen before Login (D104 in FIG. 3)

Display permission of a system information screen before login is a setting item indicating whether to permit display of a system information screen before the user logs in. Either "OFF" (not permitted) or "ON" (permitted) is stored as a setting value.

In the present embodiment, it is assumed that transition (display timing) of a system information screen is switched according to combination of setting values described above in (1) and (2). FIG. 4 is a table illustrating screen transition modes associated with combination of setting values.

It is assumed that the following four modes are available as screen transition modes.

(A) Security First Priority Mode

The security first priority mode is a mode in a case where a setting value for priority display of a system information screen is "OFF", and a setting value for display permission of a system information screen before login is "OFF". This mode is a mode suitable for a case where a function of directly inputting an operation to the image forming apparatus 10, such as a copy function or a scan function is mainly used, and is displayed exclusively to a user who has performed an operation for displaying a system information screen for security or other reasons.

(B) Security Priority Mode

The security priority mode is a mode in a case where a setting value for priority display of a system information screen is "ON", and a setting value for display permission of a system information screen before login is "OFF". This mode is a mode suitable for a case in which a function that does not require a direct operation with respect to the image forming apparatus 10, such as a print function, is mainly used, and a system information screen is preferentially displayed as an initial screen to a user who uses a function of directly inputting an operation to the image forming apparatus 10, such as a copy function and a scan function.

(C) Convenience Priority Mode

The convenience priority mode is a mode in a case where a setting value for priority display of a system information screen is "OFF", and a setting value for display permission of a system information screen before login is "ON". This mode is a mode suitable for a case in which a user who mainly uses a function of directly inputting an operation to the image forming apparatus 10, such as a copy function and a scan function desires to check a status of the apparatus before login.

(D) Convenience First Priority Mode

The convenience first priority mode is a mode in a case where a setting value for priority display of a system information screen is "ON", and a setting value for display permission of a system information screen before login is "ON. This mode is a mode suitable for a case in which a user who mainly uses a function that does not require a direct operation with respect to the image forming apparatus 10, such as a print function, desires to check a status of the apparatus before login, or a case in which a user who mainly uses a function of directly inputting an operation to the image forming apparatus 10, such as a copy function or a scan function, desires to check a status of the apparatus before/after login.

Note that, as illustrated in FIG. 3, the setting information storage area 162 may store setting information related to an IP address of the image forming apparatus 10, availability of Wi-Fi Direct, availability of a remote operation, a paper size and a paper type for each paper feed tray, and the like.

The message information storage area 164 stores information (message information) on a message to the user. The message information includes, for example, as illustrated in FIG. 5, a message ID (e.g., "1") for identifying a message, and a message (e.g., "toner has run out.").

The message may include a content of processing to be performed by the controller 100, in a case where a message is selected, such as "display an image job log when selecting". The message information may also include, as information other than the information described above, information such as a type of a message, a date and time when a message has been created, and a creator of a message.

The message information storage area 164 may also store an error message indicating a content of an error (error information) that has occurred in the image forming apparatus 10.

The apparatus information storage area 166 stores information (apparatus information) indicating a status of the image forming apparatus 10. As illustrated in FIG. 6, for example, the apparatus information includes an item name (e.g., "toner remaining amount (Bk)"), and an item value (e.g., "100%") indicating information of the item.

The job log storage area 168 stores a log (job log) of an executed job. The job log includes, for example, a job ID (e.g., "0025") for identifying a job, a type (e.g., "print") of an executed job, a date and time (e.g., "2021/04/01 16:20:50") of execution of the job, a status (e.g., "finished") of processing of the job. Note that, information on a log other than a job log may be stored in the storage 160.

The communicator 190 communicates with an external device via a local area network (LAN) or a wide area network (WAN). The communicator 190 is configured of, for example, a communication device or a communication module such as a network interface card (NIC) to be used in a wired/wireless LAN.

1.2 Flow of Processing

A flow of processing to be performed by the image forming apparatus 10 according to the present embodiment is described with reference to FIGS. 7 to 11. The processing illustrated in FIGS. 7 to 11 is performed by causing the controller 100 of the image forming apparatus 10 to read a program stored in the storage 160. Further, it is assumed that the user authentication function is enabled, and the login processor 106 is enabled to perform login processing.

1.2.1 Main Processing

Figure 7:
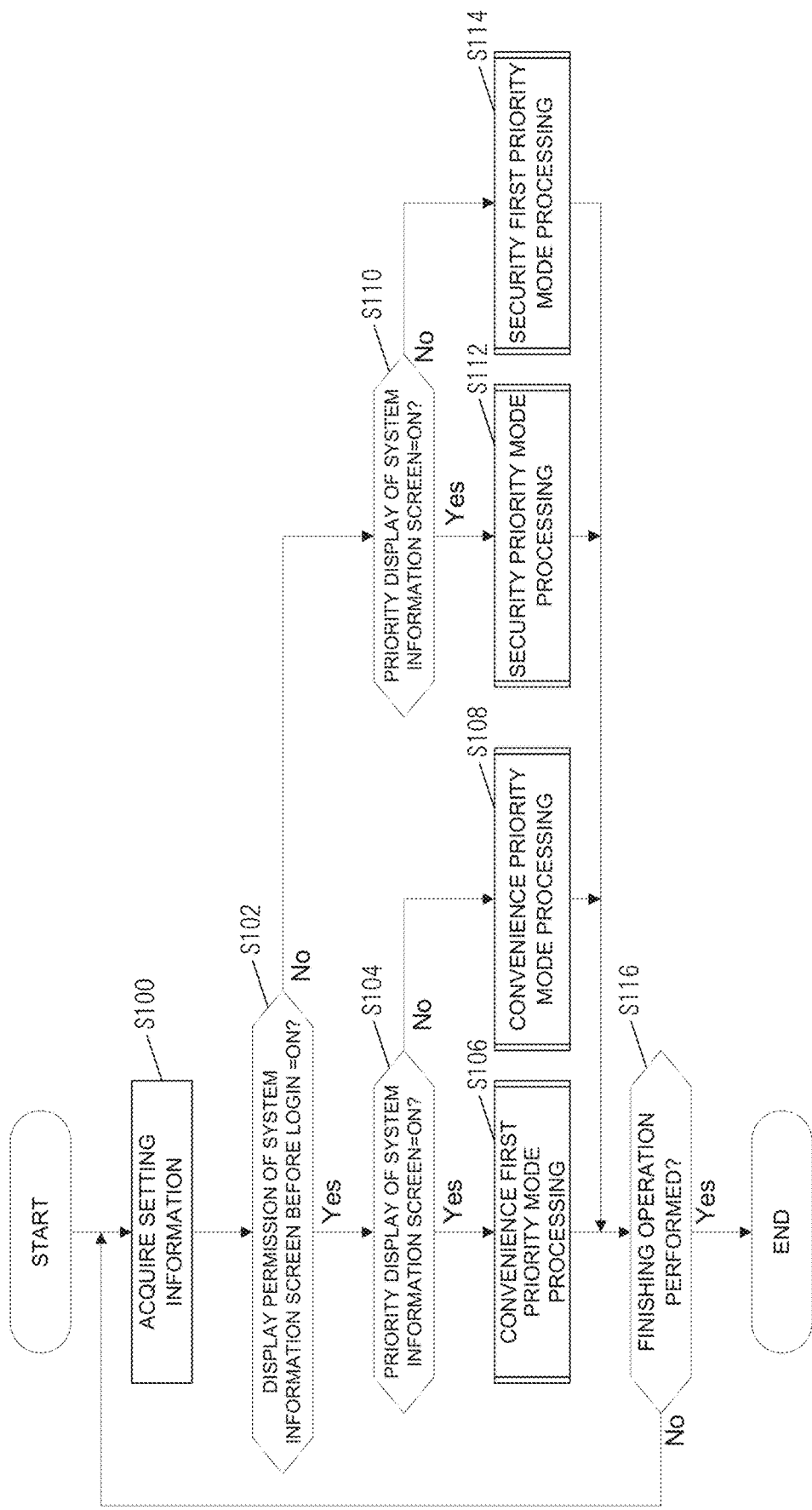
FIG. 7 is a flowchart illustrating a flow of main processing of the image forming apparatus according to the first embodiment.

Referring to FIG. 7, a flow of main processing (main processing) to, be performed by the image forming apparatus 10 is described. First, the controller 100 acquires, from the setting information storage area 162, setting information related to a system information screen (priority display of a system information screen, and display permission of a system information screen before login) (step S100).

Subsequently, the controller 100 determines whether a setting value for display permission of a system information screen before login is "ON" (step S102). In a case where the setting value for display permission of a system information screen before login" is "ON", the controller 100 determines whether a setting value for priority display of a system information screen is "ON" (step S102; Yes→step S104).

In a case where the setting value for priority display of a system information screen is "ON", the controller 100 determines a screen transition mode is the convenience first priority mode, and performs convenience first priority mode processing of performing screen transition according to the mode (step S104; Yes→step S106). The convenience first priority mode processing is described later.

On the other hand, in a case where the setting value for priority display of a system information screen is "OFF" the controller 100 determines that the screen transition mode is the convenience priority mode, and performs convenience priority mode processing of performing screen transition according to the mode (step S104; No→step S108). The convenience priority mode processing is described later.

Further, in a case where the controller 100 determines that the setting value for display permission of a system information screen before login is "OFF" in step S102, the controller 100 determines whether the setting value for priority display of a system information screen is "ON" (step S102; No→step S110).

In a case where the setting value for priority display of a system information screen is "ON" the controller 100 determines that the screen transition mode is the security priority mode, and performs security priority mode processing of performing screen transition according to the mode (step S110; Yes→step S112). The security priority mode processing is described later.

On the other hand, in a case where the setting value for priority display of a system information screen is "OFF", the controller 100 determines that the screen transition mode is the security first priority mode, and performs security first priority mode processing of performing screen transition according to the mode (step S110; No→step S114). The security first priority mode processing is described later.

The controller 100 determines whether a finishing operation has been performed after execution of processing in step S106, step S108, step S112 or step S114 (step S116). The finishing operation is, for example, an operation of turning off the power of the image forming apparatus 10. In a case where a finishing operation has been performed, the controller 100 terminates the processing illustrated in FIG. 7 (step S116; Yes). On the other hand, in a case where a finishing operation has not been performed, the controller 100 returns to step S100 (step S116; No→step S100).

1.2.2 Convenience First Priority Mode Processing

A flow of convenience first priority mode processing is described with reference to FIG. 8. First, the controller 100 displays a system information screen as a tab (step S200). The tab display means displaying a system information screen and other screens (e.g., a default display screen, a home screen, and an operation screen) to be switchable by a tab. The other screens are, for example, a login screen in a case before the user logs in; and a home screen, a copy screen, and the like in a case after the user logs in. For example, an area (system area) of a predetermined height is provided on an upper portion of a screen, and the controller 100 displays a tab for switching a screen in the system area. Herein, the controller 100 displays, as tabs to be displayed on a screen before login, a tab for displaying a system information screen, and a tab for displaying a login screen.

Subsequently, the controller 100 displays a system information screen on the displayer 140 (step S202). At this occasion, the controller 100 may display a tab for displaying a system information screen in a selected state among the tabs displayed in step S200. Subsequently, the controller 100 determines whether the tab of a login screen has been selected (step S204). Note that, the controller 100 continues to display a system information screen until the tab for a login screen is selected (step S204; No).

When the tab for a login screen has been selected, the controller 100 displays the login screen on the displayer 140 (step S204; Yes→step S206), and determines whether a login operation by the user has been performed (step S208). Herein, in a case where a login operation has not been performed, the controller 100 determines whether a tab for a system information screen has been selected (step S208; No→step S210). In a case where the tab for a system information screen has been selected, the controller 100 returns to step S202 (step S210; Yes→step S202), and in a case where the tab for a system information screen has not been selected, the controller 100 returns to step S208 (step S210; No→step S208).

On the other hand, in a case where it is determined that a login operation has been performed in step S208, the controller 100 (login processor 106) performs login processing (step S208; Yes→step S212). Note that, in a case where a user login is not allowed, the login processor 106 may perform error processing such as displaying an error message.

In a case where a user login is allowed, the controller 100 displays a system information screen on the displayer 140 (step S212; Yes→step S214). Note that, similarly to a case before login, a system area is provided on an upper portion of the screen, and the controller 100 displays a tab for switching a screen in the system area. Herein, the controller 100 displays, as tabs to be displayed on a screen after login, a tab for displaying a system information screen, a tab for displaying a home screen, and a tab for displaying an operation screen. The controller 100 may also include, in a system area, a logout button for allowing the user to perform a logout operation.

Subsequently, the controller 100 determines whether a logout operation has been performed (step S216). In a case where a logout operation has been performed, the controller 100 performs logout processing for allowing the login user to log out, and terminates the processing illustrated in FIG. 8 (step S216; Yes→step S218).

On the other hand, in a case where a logout operation has not been performed, the controller 100 determines whether an operation of selecting a tab other than the tab for a system information screen has been performed by the user (step S216; No→step S220). In a case where an operation of selecting a tab other than the tab for a system information screen has not been performed, the controller 100 returns to step S216 (step S220; No→step S216). In this case, the controller 100 maintains display of the system information screen.

On the other hand, in a case where an operation of selecting a tab other than the tab for a system information screen has been performed, the controller 100 displays, on the displayer 140, a screen associated with the tab selected by the user in response to the operation (step S220; Yes→step S222). This allows the controller 100 to display a home screen or an operation screen on the displayer 140.

Subsequently, the controller 100 determines whether an operation of selecting the tab for a system information screen has been performed by the user (step S224). In a case where an operation of selecting the tab for a system information screen has been performed, the controller 100 returns to step S214 (step S224; Yes→step S214). This allows the controller 100 to display a system screen on the displayer 140.

On the other hand, in a case where an operation of selecting the tab for a system information screen has not been performed, the controller 100 performs predetermined processing (step S224; No→step S226). For example, in a case where an operation of selecting a tab (home tab) for displaying a home screen has been performed, in step S226, the controller 100 displays the home screen on the displayer 140. Also, in a case where an operation of selecting a tab for displaying an operation screen has been performed, in step S226, the controller 100 displays the operation screen on the displayer 140. In addition to the above, the controller 100 performs settings of a job, or executes a job in response to a user operation. Also, in a case where a logout operation has been performed by the user, the controller 100 may perform logout processing, and terminate the processing illustrated in FIG. 8.

Subsequently, the controller 100 determines whether settings of a job have been cleared (step S228). In a case where settings of a job have been cleared, the controller 100 returns to step S214 (step S228; Yes→step S214). Specifically, when settings of a job have been cleared, the controller 100 displays a system information screen on the displayer 140.

Note that, settings of a job are cleared, for example, when an operation of clearing settings of a job has been performed by the user, when execution of a job is completed, or when an input operation from the user has not been performed for a predetermined period of time after completion of job execution.

On the other hand, in a case where settings of a job have not been cleared, the controller 100 returns to step S224 (step S228; No→step S224).

In this way, in the convenience first priority mode, after login, or in a case where settings of a job are cleared, the controller 100 preferentially displays a system information screen by displaying the system information screen on the displayer 140.

Note that, in description on a flow of the convenience first priority mode processing, description has been made based on a premise that the controller 100 displays a system display screen, when a user login is permitted. However, a default display screen (e.g., a home screen) may be displayed, when a user login is permitted. Specifically, the controller 100 may preferentially display a system information screen before login, and preferentially display a default display screen after login. Note that, whether a screen to be displayed for the first time after login is a system information screen or a default display screen may be determined in advance, or may be selectable by the user.

1.2.3 Convenience Priority Mode Processing

A flow of convenience priority mode processing is described with reference to FIG. 9. First, the controller 100 displays a login screen on the displayer 140 (step S300). Subsequently, the controller 100 cancels tab display of a system information screen (step S302). In other words, the controller 100 changes a screen transition method in such a way that a screen is switchably displayed by a method other than a tab, rather than switchably displaying a system information screen and other screens by a tab. For example, the controller 100 makes a screen switchable by a button. In this case, the controller 100 performs display control of a button to be displayed in a system area as follows according to a screen to be displayed.

(1) When a Screen Other than a System Information Screen is Displayed

When a screen other than a system information screen is displayed, the controller 100 displays, in a system area, a system information screen button for displaying a system information screen, in addition to a home button for displaying a home screen, and a button for displaying an operation screen.

(2) When a System Information Screen is Displayed

When a system information screen is displayed, the controller 100 displays, in a system area, a button (close button) for hiding the system information screen, in addition to a home button, and a button for displaying an operation screen. Specifically, the controller 100 displays a close button in a system area, instead of a system information screen.

Subsequently, the controller 100 determines whether a login operation has been performed (step S304). In a case where a login operation has not been performed, the controller 100 determines whether the system information screen button has been selected (step S304; No→step S306).

In a case where the system information screen button has not been selected, the controller 100 returns to step S304 (step S306; No→step S304). On the other hand, in a case where the system information screen button has been selected, the controller 100 displays a system information screen on the displayer 140 (step S306; Yes→step S308). Further, the controller 100 determines whether a [close] button included and displayed on the system information screen has been selected (step S310), and continues to display the system information screen until the [close] button is selected (step S310; No). On the other hand, in a case where the [close] button has been selected, the controller 100 returns to step S300 (step S310; Yes→step S300). This allows the system information screen to be closed, and allows a login screen to be displayed on the displayer 140.

On the other hand, in step S304, in a case where it is determined that a login operation has been performed, the controller 100 (login processor 106) performs login processing (step S304; Yes→step S312). Also, in a case where a user login is permitted, the controller 100 displays a default display screen on the displayer 140 (step S314).

Subsequently, the controller 100 determines whether a logout operation has been performed (step S316). In a case where a logout operation has been performed, the controller 100 performs logout processing, and terminates the processing illustrated in. FIG. 9 (step S316; Yes→step S318). On the other hand, in a case where a logout operation has not been performed, the controller 100 determines whether the system information screen button has been selected (step S316; No→step S320).

In a case where the system information screen button has been selected, the controller 100 displays a system information screen on the displayer 140, and returns to step S316 (step S320; Yes→step S322→step S316). On the other hand, in a case where an operation other than an operation of selecting the system information screen button has been performed, the controller 100 performs processing associated with the operation, and returns to step S316 (step S320; Yes→step S324→step S316). For example, in a case where the [close] button is selected, in step S324, the controller 100 hides the system information screen, and displays, on the displayer 140, a screen that has been displayed before displaying the system information screen.

Note that, in a case where settings of a job have been cleared, or an input operation from the user has not been performed for a predetermined period of time after job execution, the controller 100 displays a default display screen on the displayer 140. This allows the default display screen to be displayed as an initial screen after login.

1.2.4 Security Priority Mode Processing

A flow of security priority mode processing is described with reference to FIG. 10. First, the controller 100 displays a login screen on the displayer 140 (step S400), and determines whether a login operation has been performed (step S402). The controller 100 continues to display the login screen until a login operation is performed (step S402; No). On the other hand, in a case where a login operation has been performed, the controller 100 (login processor 106) performs login processing (step S402; Yes→step S404).

In a case where a user login is allowed, the controller 100 displays a system information screen as a tab (step S406). The processing in step S406 is the same as the processing in step S200 in FIG. 8. Further, the controller 100 displays the system information screen on the displayer 140 (step S408).

Subsequently, the controller 100 determines whether a logout operation has been performed (step S410). In a case where a logout operation has been performed, the controller 100 performs logout processing, and terminates the processing illustrated in FIG. 10 (step S410; Yes→step S412). On the other hand, in a case where a logout operation has not been performed, the controller 100 determines whether an operation of selecting a tab other than the tab for a system information screen has been performed by the user (Step S410; No→step S414). In a case where an operation of selecting a tab other than the tab for a system information screen has not been performed, the controller 100 returns to step S410 (step S414; No→step S410). In this case, the controller 100 maintains display of the system information screen.

On the other hand, in a case where an operation of selecting a tab other than the tab for a system information screen has been performed, the controller 100 displays, on the displayer 140, a screen associated with the tab selected by the user in response to the operation (step S414; Yes→step S416). This allows the controller 100 to display a home screen or an operation screen on the displayer 140.

Subsequently, the controller 100 determines whether an operation of selecting the tab for a system information screen has been performed by the user (step S418). In a case where an operation of selecting the tab for a system information screen has been performed, the controller 100 returns to step S408 (step S418; Yes→step S408). This allows the controller 100 to display a system information screen on the displayer 140.

On the other hand, in a case where an operation of selecting the tab for a system information screen has not been performed, the controller 100 performs predetermined processing (step S418; No→step S420).

Subsequently, the controller 100 determines whether settings of a job have been cleared (step S422). In a case where settings of a job have been cleared, the controller 100 returns to step S408 (step S422; Yes→step S408). Specifically, when settings of a job have been cleared, the controller 100 displays a system information screen on the displayer 140. On the other hand, in a case where settings of a job have not been cleared, the controller 100 returns to step S418 (step S422; No→step S418).

In this way, in the security priority mode, after login, or in a case where settings of a job have been cleared, the controller 100 preferentially displays a system information screen by displaying the system information screen on the displayer 140.

1.2.5 Security First Priority Mode Processing

Figure 11:
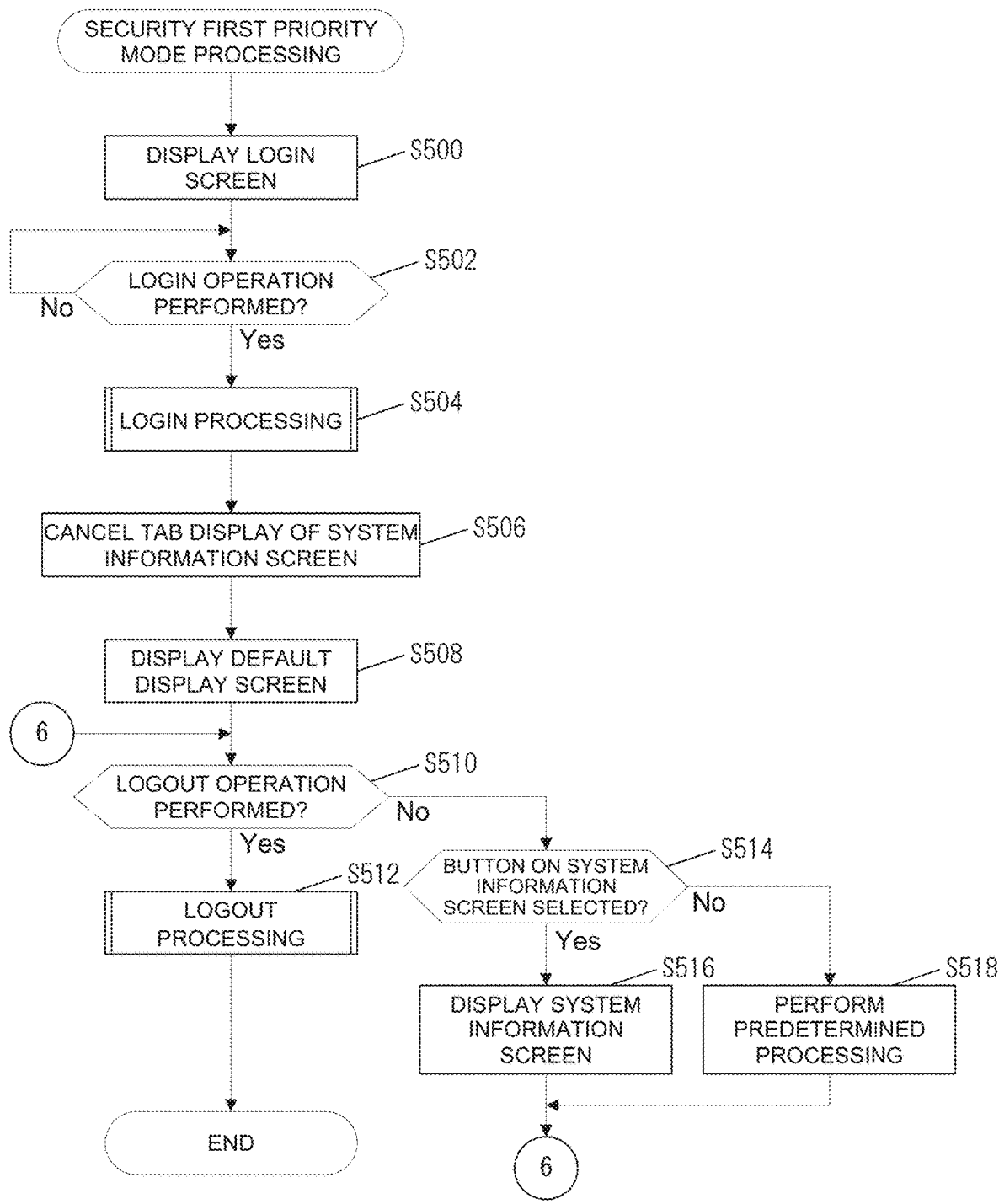
FIG. 11 is a flowchart illustrating a flow of security first priority mode processing according to the first embodiment.

Referring to FIG. 11, a flow of security first priority mode processing is described. First, the controller 100 displays a login screen on the displayer 140 (step S500), and determines whether a login operation has been performed (step S502). The controller 100 continues to display the login screen until a login operation is performed (step S502; No). On the other hand, in a case where a login operation has been performed, the controller 100 (login processor 106) performs login processing (step S502; Yes→step S504).

In a case where a user login is allowed, the controller 100 cancels tab display of a system information screen (step S506). Note that, the processing in step S506 is the same as the processing in step S302 in FIG. 9. Further, the controller 100 displays a default display screen on the displayer 140 (step S508).

Subsequently, the controller 100 determines whether a logout operation has been performed (step S510). In a case where a logout operation has been performed, the controller 100 performs logout processing, and terminates the processing illustrated in FIG. 11. (step S510; Yes→step S512). On the other hand, in a case where a logout operation has not been performed, the controller 100 determines whether an operation of selecting the system information screen button has been performed by the user (step S510; No→step S514). In a case where the system information screen button has been selected, the controller 100 displays a system information screen on the displayer 140, and returns to step S510 (step S514; Yes→step S516→step S510). On the other hand, in a case where an operation other than an operation of selecting the system information screen button has been performed, the controller 100 performs processing associated with the operation, and returns to step S510 (step S514; No→step S518→step S510).

Note that, in a case where settings of a job have been cleared, or an input operation from the user has not been performed for a predetermined period of time after job execution, the controller 100 displays a default display screen on the displayer 140.

1.3 Operation Example

An operation example of screen transition according to the present embodiment is described. Note that, in the following description, it is assumed that a home screen is set as a default display screen.

Figure 12:
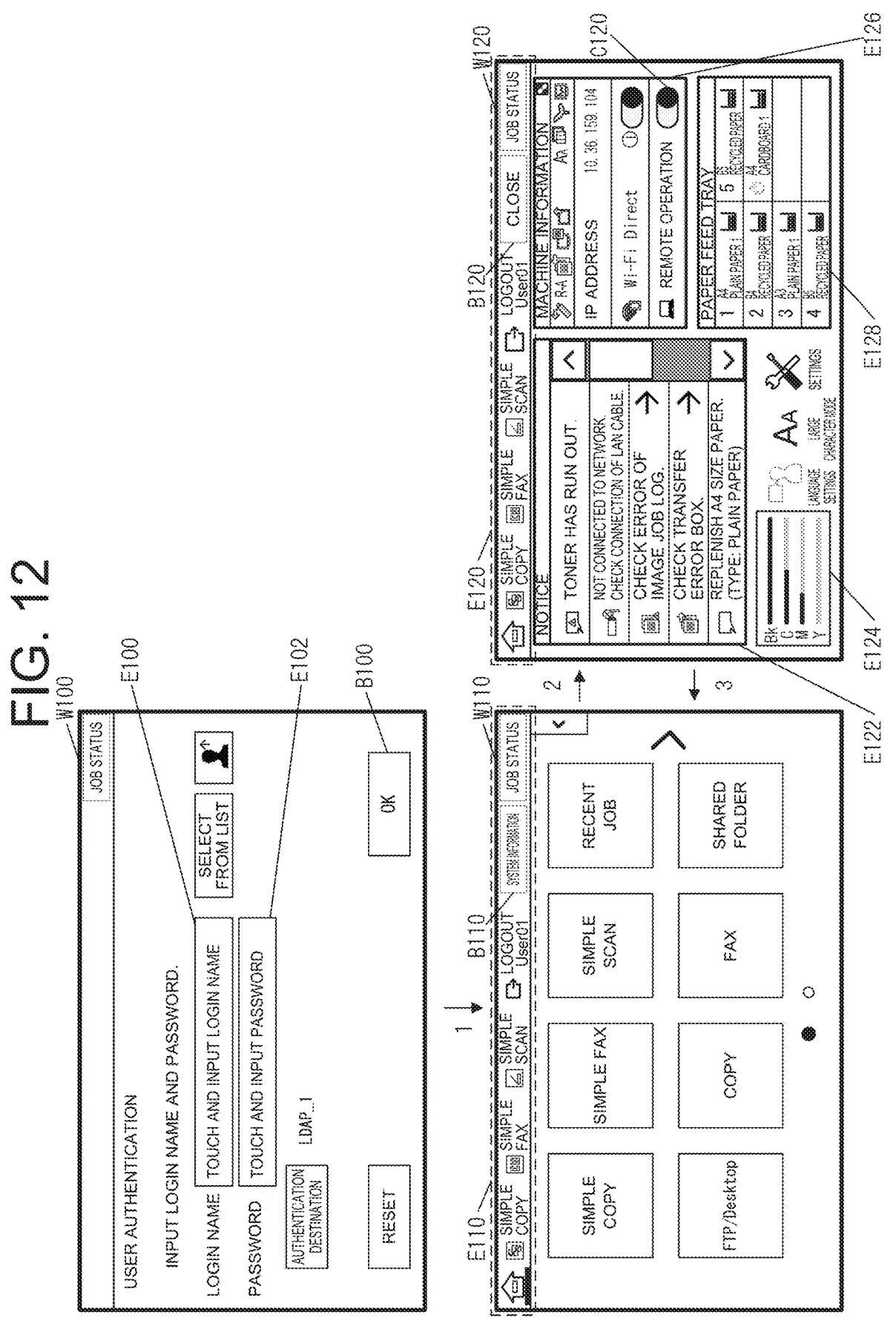

FIG. 12 is a diagram illustrating screen transition in a case where the screen transition mode is the security first priority mode. FIG. 12 is a diagram illustrating a screen example including a login screen W100, a home screen W110, and a system information screen W120. Also, the arrows in FIG. 12 indicate a screen transition destination.

In a case where the mode is the security first priority mode, first, the login screen W100 is displayed on the displayer 140. The login screen W100 includes a login name input field E100, and a password input field E102, and further includes a button B100 for accepting a login operation.

Authentication information is input in the input field E100 and the input field E102 by the user, and login processing is performed by selecting the button B100. In a case where a login is allowed, the home screen W110, which is a default display screen, is displayed (FIG. 12, 1).

Herein, a system area E110 secured on an upper portion of the screen includes a button (system information screen button) B110 for displaying a system information screen. In a case where the button B110 is selected by the user, the system information screen W120 is displayed (FIG. 12, 2). In other words, a screen to be displayed is shifted to the system information screen W120. Note that, the button B110 may be displayed on a screen other than the home screen.

In addition, a system area E120 is secured on an upper portion of the system information screen W120. The system area E120 also includes a [close] button B120. In a case where the button B120 is selected by the user, the system information screen W120 is closed, and a screen that has been displayed before the system information screen W120 is displayed is displayed again (FIG. 12, 3).

The system information screen W120 displays information based on setting information, message information, and apparatus information. For example, an area E122 on the system information screen W120 is an area (notice area) in which a message included in message information is displayed, for each piece of the message information. Along with the message, an icon associated with each message type, and a date and time when a message has been created may also be displayed. Note that, an error message may be displayed in the notice area in a distinguishable manner. In addition, each of an error message, and a message other than the error message may be displayed in a different area.

An area E124 is an area (toner remaining amount area) where a toner remaining amount is displayed based on apparatus information. An area E126 is an area (machine information area) where a setting item name (e.g., an "IP address") and a setting value (e.g., "10.36.159.104") included in setting information are displayed. In other words, the area E126 is an area where an item (setting item) for setting an operation of the image forming apparatus 10 is displayed.

Note that, the area E126 may include an input means for an operation of changing a setting value, for each setting item. In other words, an item to be displayed in the area E126 may be displayed as an item for settings related to an operation of the image forming apparatus 10. In this case, a setting value included in setting information is changeable via the system information screen W120.

For example, a slide switch C120 for switching a setting value to "ON" or "OFF" may be displayed. When the slide switch C120 is operated by the user, a value associated with the operation is stored as a setting value in setting information associated with an item on which the slide switch C120 is displayed.

Further, an area E128 is an area (paper feed tray area) where a paper size, a paper type, and a paper remaining amount for each paper feed tray are displayed based on setting information and apparatus information.

Note that, the system information screen W120 illustrated in FIG. 12 indicates a display example of a system information screen, and a type of information and the number of pieces of information included in the system information screen, a layout of a screen, and the like may be settable by the user. Further, a type of information included in the system information screen, a layout, and the like may be selectable from a predetermined display pattern.

FIG. 13 is a diagram illustrating screen transition in a case where the screen transition mode is the security priority mode. FIG. 13 is a diagram illustrating a screen example including a login screen W200, a system information screen W210, and a home screen W220. Also, the arrows in FIG. 13 indicate a screen transition destination.

In a case where the mode is the security priority mode, first, the login screen W200 is displayed on the displayer 140. The login screen W200 is the same screen as the login screen W100 in FIG. 12. In a case where a login is allowed, the system information screen W210 is displayed (FIG. 13, 1). Since priority display of a system information screen is "ON" in the security priority mode, the system information screen W210 is displayed in preference to the home screen W220, which is a default display screen. In addition, since priority display of a system information screen is "ON", a tab E212 for displaying a system information screen is displayed in the system area E210.

The system area E210 includes a home button E214 (home tab) for displaying a home screen. In a case where the home button E214 is selected, the home screen W220 is displayed (FIG. 13, 2). Note that, a system area E220 is secured on an upper portion of the home screen W220, and a tab E222 for displaying a system information screen is displayed. In a case where the tab E222 is selected, the system information screen W210 is displayed (FIG. 13, 3).

Figure 14:
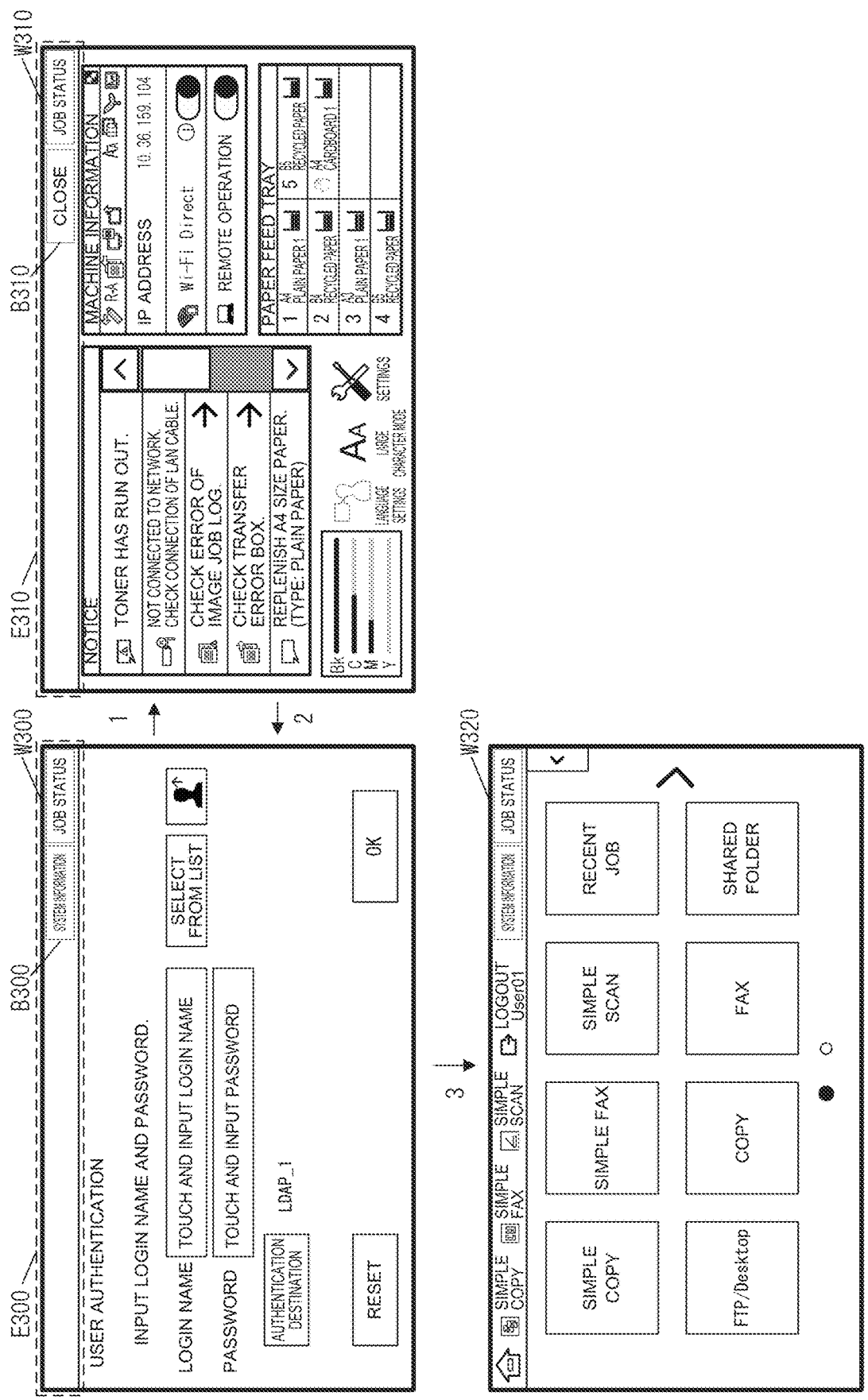
FIG. 14 is a diagram illustrating screen transition of the convenience priority mode according to the first embodiment.

FIG. 14 is a diagram illustrating screen transition in a case where the screen transition mode is the convenience priority mode. FIG. 14 is a diagram illustrating a screen example including a login screen W300, a system information screen W310, and a home screen W320. Also, the arrows in FIG. 14 indicate a screen transition destination.

In a case where the mode is the convenience priority mode, first, the login screen W300 is displayed on the displayer 140. The login screen W300 is the same screen as the login screen W100 in FIG. 12, but a button B300 for displaying a system information screen is included in a system area E300 provided on an upper portion of the screen. In a case where the button B300 is selected by the user, the system information screen W310 is displayed (FIG. 14, 1).

A system area E310 is secured on an upper portion of the system information screen W310. The system area E310 also includes a [close] button 8310. In a case where the button 8310 is selected by the user, the system information screen W310 is closed, and the login screen W300 is displayed again (FIG. 14, 2). Note that, in a case where login processing is performed on the login screen W300, and a login is allowed, the home screen W320, which is a default display screen, is displayed (FIG. 14, 3).

Figure 15:
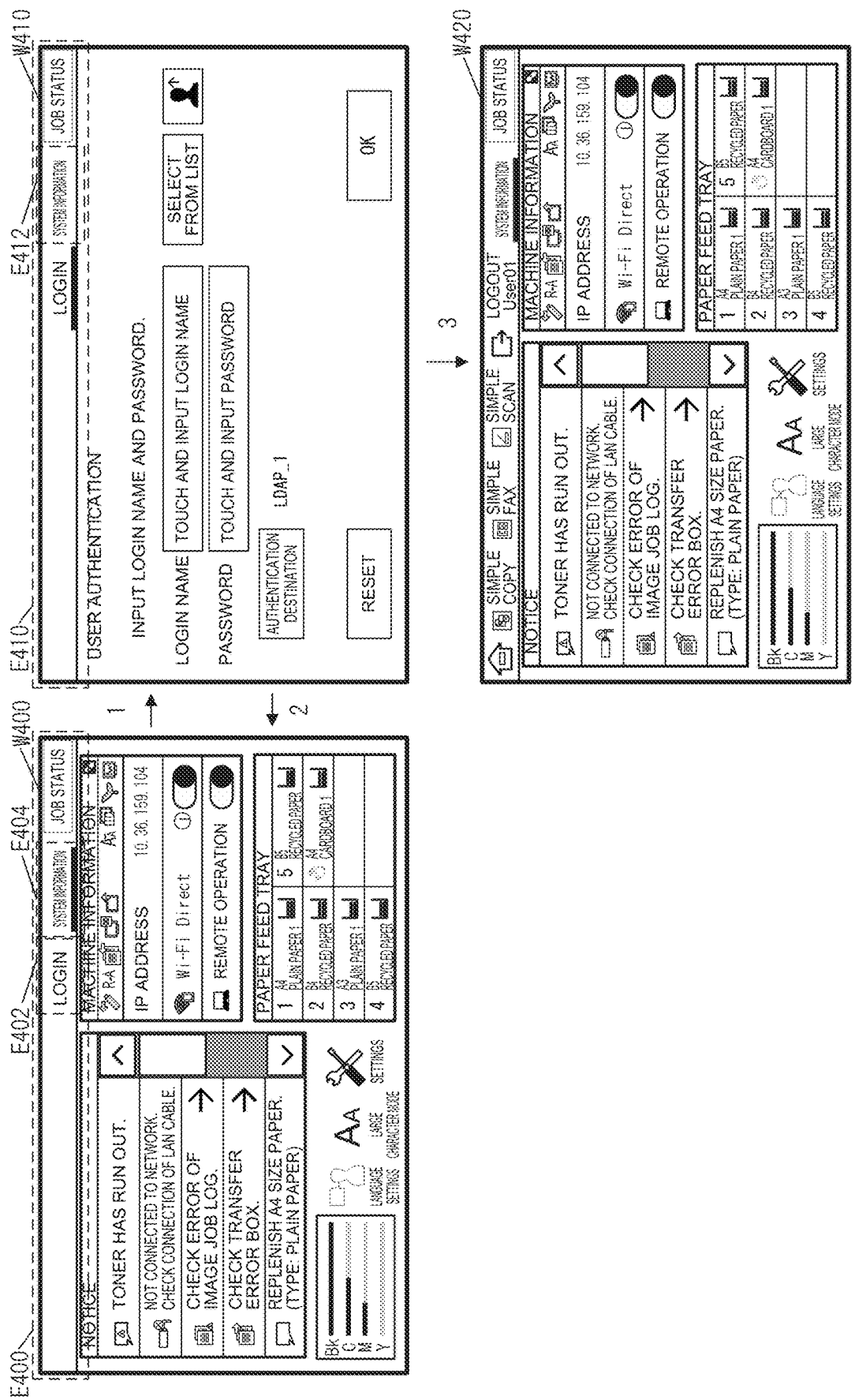
FIG. 15 is a diagram illustrating screen transition of the convenience first priority mode according to the first embodiment.

FIG. 15 is a diagram illustrating screen transition in a case where the screen transition mode is the convenience first priority mode. FIG. 15 is a diagram illustrating a screen example including a system information screen W400, a login screen W410, and a home screen W420. Also, the arrows in FIG. 15 indicate a screen transition destination.

In a case where the mode is the convenience first priority mode, first, the system information screen W400 is displayed on the displayer 140. In addition, a system area E400 is secured on an upper portion of the system information screen W400, and a tab E402 for displaying a login screen, and a tab E404 for displaying a system information screen are included. In a case where the tab E402 is selected, the login screen W410 is displayed. (FIG. 15, 1). In addition, a system area E410 is secured on an upper portion of the login screen W410, and a tab E412 for displaying a system information screen is included. In a case where the tab E412 is selected, the system information screen W400 is displayed 15, 2). Note that, in a case where login processing is performedon the login screen W410, and a login is allowed, the home screen W420, which is a default display screen, is displayed (FIG. 15, 3).

Note that, in the above description, description is made based on a premise that a screen (specific screen) to be preferentially displayed is a system information screen, but a screen to be preferentially displayed may be any screen other than a system information screen. For example, a screen to be preferentially displayed may be a screen such as a bulletin board on which information for login users is posted, or may be a screen on which history information on a job, setting information at a time of job execution and the like are displayed. This allows the controller 100 to set a screen display method that requires a specific instruction by a user in displaying, to either a method of displaying in preference to an initial screen, or a method of displaying after receiving a specific instruction according to an operational status of the user.

Further, in the above description, description is made for a case where the user authentication function is enabled. In a case where the user authentication function is disabled, the controller 100 may control in such a way as to display a system information screen by an ordinary method, without preferentially displaying the system information screen. Specifically, in a case where the user authentication function is disabled, the controller 100 may display a system information screen on the displayer 140, when a specific instruction (specific operation) for displaying the system information screen is given by the user.

In this way, the image forming apparatus according to the present embodiment performs display control, even for a screen that is not displayed until a login is completed, and a predetermined display operation is performed, based on two settings: settings as to whether the screen is preferentially displayed, and settings as to whether display of the screen is allowed before login. This allows the image forming apparatus according to the present embodiment to display, as an initial screen, even a screen that is not displayed until a login is completed, and a predetermined display operation is performed. In addition, the user of the image forming apparatus according to the present embodiment can allow the image forming apparatus to achieve refined screen display control according to an operational status of the image forming apparatus.

2. Second Embodiment

Next, a second embodiment is described. The second embodiment is an embodiment, in which, in the first embodiment, a content included in a system information screen to be displayed before the user logs in, and a content included in a system information screen to be displayed after the user is authenticated are differentiated from each other. The present embodiment is an embodiment in which FIG. 5 in the first embodiment is replaced by FIG. 16, and FIG. 6 in the first embodiment is replaced by FIG. 17.

2.1 Functional Configuration

FIG. 16 is a diagram illustrating message information according to the present embodiment. The message information according to the present embodiment includes a message ID (e.g., "1"), a message type (e.g., "an in-house notification"), a pre-login message (e.g., "a medical examination is carried out from Nov. 1, 2021. ([Print] button is not displayed)"), a post-login message (e.g., "a medical examination is carried out from Nov. 1, 2021. Print a medical examination sheet, and bring it when you go for the examination. ([Print] button is displayed)"), and a date and time (e.g., "Oct. 6, 2021 14:24:21") of the message.

The message type is information indicating a type of a message based on a content of the message, and a creator of the message. The following types are available as message types, for example.

(1) In-House Notification

An in-house notification is a message to be created by an administrator of the image forming apparatus 10, or a user authorized to create a message, and is a message related to business communications, and the like. For example, an administrator or the like of the image forming apparatus 10 may create an in-house notification message via a setting screen of the image forming apparatus 10. Also, the image forming apparatus 10 may acquire an in-house notification message from a server that manages the in-house notification message, and store the message, as message information. The image forming apparatus 10 may also acquire an in-house notification message from a content of an e-mail transmitted to a predetermined address, or a social networking service (SNS) message posted to a predetermined account, and store as message information.

(2) External Notification

An external notification is a message related to a notice from an external party (e.g., a dealer). For example, the image forming apparatus 10 periodically acquires a content of a message from a server or the like that is managed by a dealer of the image forming apparatus 10, and stores as message information.

(3) Notification from MFP

A notification from an MFP is a message to be generated by the image forming apparatus 10. For example, the notification is generated in a case where an error has occurred during job execution, or in a case where unchecked receipt data are present. A notification from an MFP may be distinguishable between an error message, and a message other than the error message.

Further, a pre-login message is a content of a message to be displayed in a case where a system information screen is displayed before login, and a post-login message is a content of a message to be displayed in a case where a system information screen is displayed after login. A date and time of a message may be a date and time when a message is stored, a date and time when a message is created, or a date and time set by a creator of a message.

FIG. 17 is a diagram illustrating apparatus information according to the present embodiment. In the present embodiment, for example, a last logout date and time (D500 in FIG. 17), an IP address change flag (D502 in FIG. 17), and a paper feed tray change flag (D504 in FIG. 17) are stored as apparatus information.

Herein, the IP address change flag is information indicating whether settings of an IP address of the image forming apparatus 10 have been changed by a user operation. The paper feed tray change flag is information indicating whether settings of a paper size or a paper type of a paper feed tray 132 of the image forming apparatus 10 have been changed by a user operation. Such flag information indicating that settings have been thanged is stored by an apparatus information collector 104.

For example, the apparatus information collector 104 acquires an IP address, and a setting value for the paper feed tray 132 at a time when a user logs in, and a setting value at a time when the user logs out, and compares between them. In a case where a setting value at a login time, and a setting value at a logout time are different, the apparatus information collector 104 stores "Yes" in an item value of an item name associated with the setting value. Also, the apparatus information collector 104 stores, as a last logout date and time, a date and time when logout processing has been performed by a controller 100. Note that, the apparatus information collector 104 may store "Yes" as flag information such as an IP address change flag, and a paper feed tray change flag, and thereafter, update the flag information to "No" at a timing when a login operation is performed a predetermined number of times (e.g., one or five times). Further, the flag information may be information other than the IP address change flag and the paper feed tray change flag described above.

2.2 Flow of Processing

In the present embodiment, the controller 100 differentiates information to be included in a system information screen according to whether a timing of displaying a system information screen is before the user logs in or after the user logs in.

For example, the controller 100 displays, in a notice area of a system information screen to be displayed before login, a content of a pre-login message included in message information, and displays, in a notice area of a system information screen to bd displayed after login, a content of a post-login message included in message information.

Figure 8:
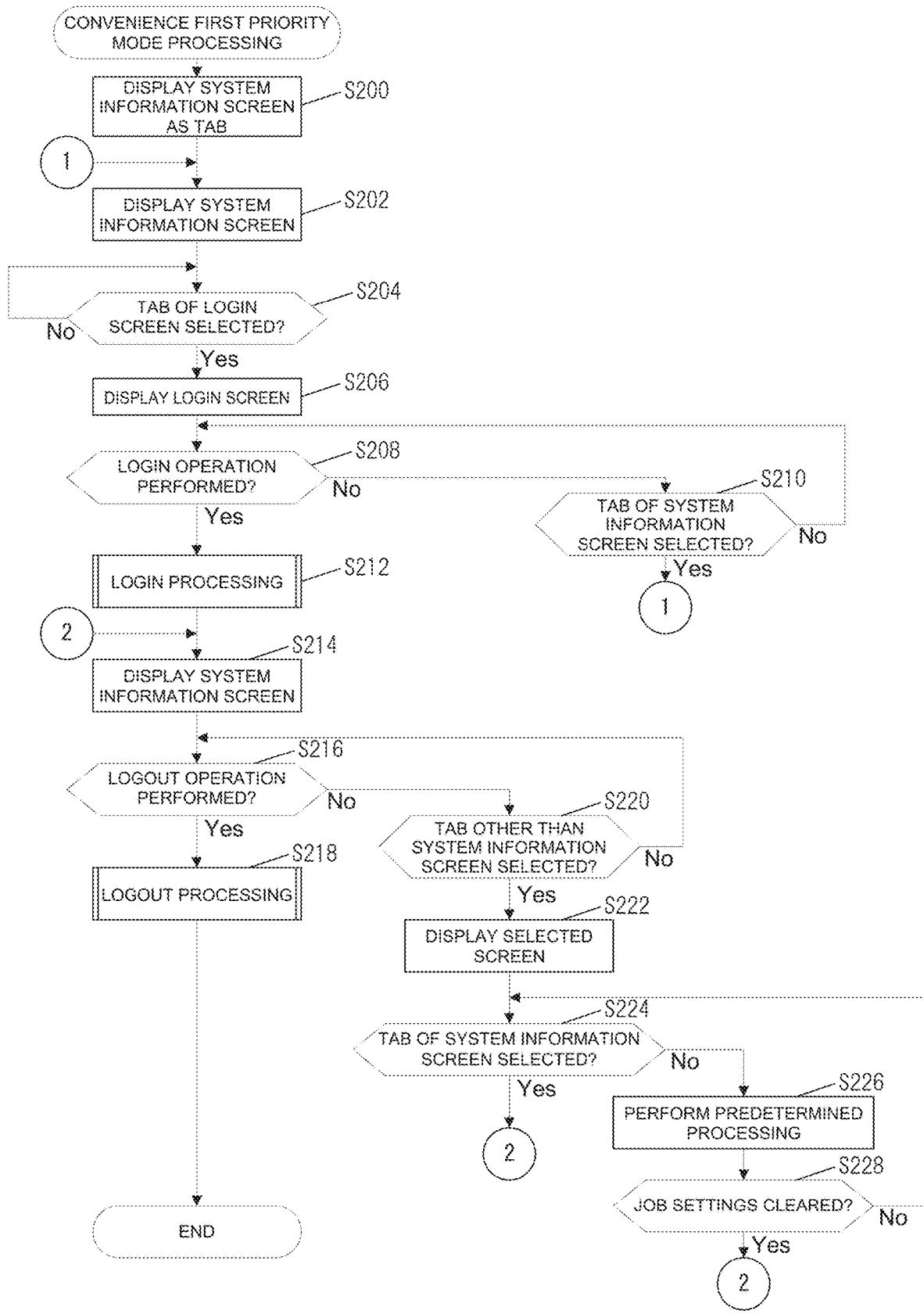
FIG. 8 is a flowchart illustrating a flow of convenience first priority mode processing according to the first embodiment.
Figure 9:
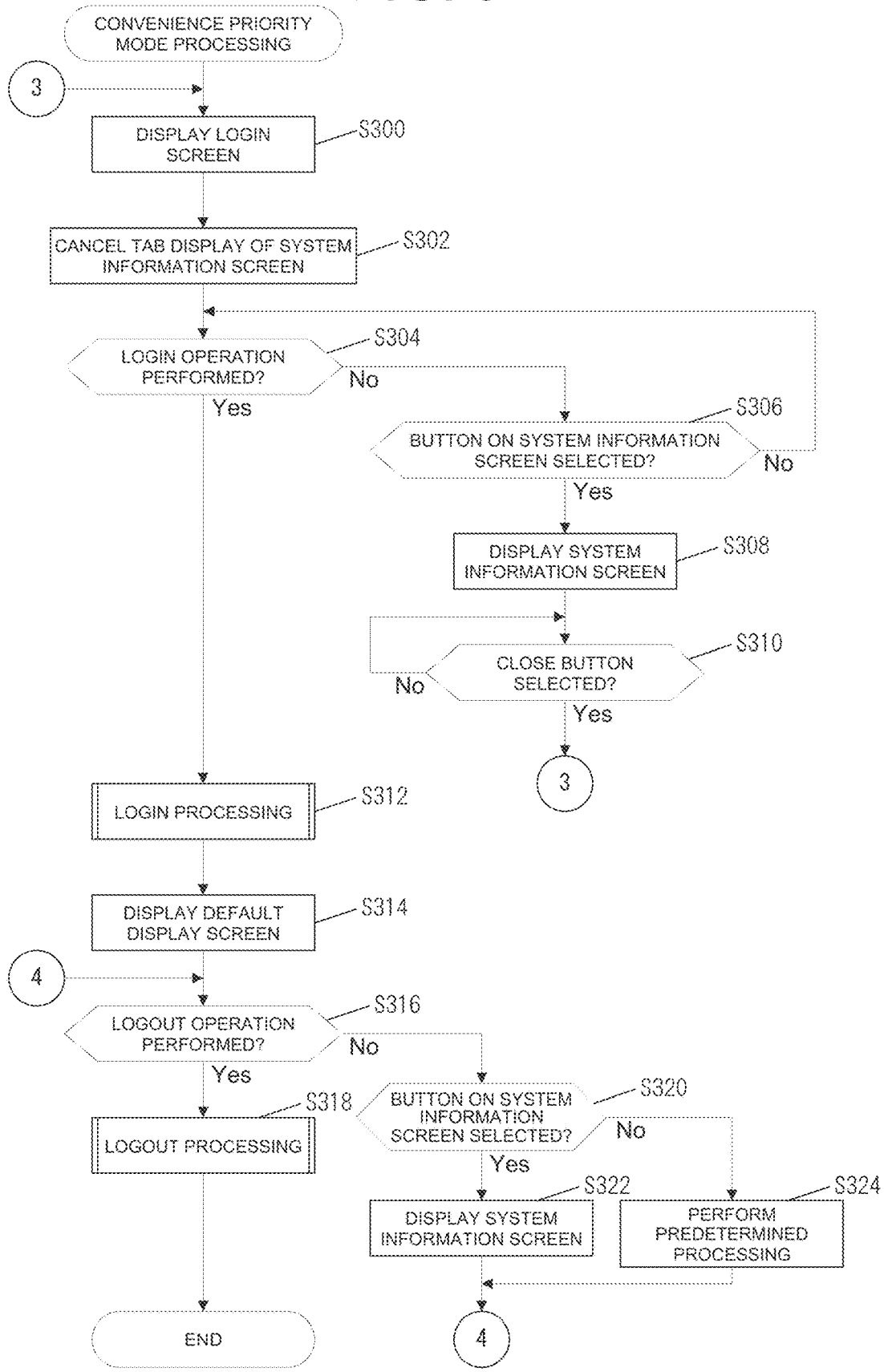
FIG. 9 is a flowchart illustrating a flow of convenience priority mode processing according to the first embodiment.

The controller 100 also performs one or more pieces of processing among the following pieces of processing, when displaying a system information screen on a displayer 140 in step S202 in FIG. 8 or step S308 in FIG. 9.

(1) Processing of Hiding a Part of Information

The controller 100 hides or masks a part of information (text) among information included in a system information screen. For example, the controller 100 may hide or mask an IP address of the image forming apparatus 10. The information to be hidden, and a hiding method may be determined in advance, or may be settable by the user.

(2) Processing of Displaying Alternative Information for Confidential Information The controller 100 displays alternative information (text) for confidential information (text). For example, in a case where an IP address of the image forming apparatus 10 is hidden, and the IP address has been changed (when the IP address change flag is "Yes"), the controller 100 displays information indicating that "the IP address has been changed" on a system information screen. This allows the controller 100 to indicate that settings or a status have been changed before login, in a case where settings or a status have been changed from the previous login time.

(3) Processing of Disabling an Operation of Changing Settings

The controller 100 hides or disables a changing means (e.g., a slide switch) for changing a setting value in an area where display based on setting information is performed. This allows the controller 100 to disable (prohibit) an operation of changing settings before login.

(4) Processing of Restricting an Item to be Displayed in a Notice Area to a Content that can be Handled by the User Before Login The controller 100 restricts and displays an item (message) to be displayed in a notice area to a content that can be handled before login. For example, the controller 100 may display a message of a content such as "run out of paper" or "a paper discharge tray is full", but may hide "firmware update information". In this case, the controller 100 may determine a message to be displayed on a system information screen before login according to a message type included in message information. For example, the controller 100 may display only a message whose message type is "an in-house notification" or "a notice from an MFP" on a system information screen before login.

Further, the controller 100 may display only information whose message type is "a notice from an MFP", and whose message content is an error message (error information). Also, in a case where the paper feed tray change flag is "Yes", the controller 100 may display a notification such as "settings of a paper feed tray have been changed". Specifically, the controller 100 may display a notification based on flag information in a notice area.

(5) Processing of Displaying Only Presence or Absence of a Notice in a Notice Area The controller 100 displays only "a notice is available" or "a notice is not available" in a notice area. For example, in a case where message information including a date and time after the last logout date and time that has been stored in apparatus information is stored, the controller 100 displays "a notice is available" in a notice area, and otherwise, displays "a notice is not available" in the notice area.

(6) Processing of Hiding a Part of an Area

The controller 100 hides a part of an area on a system information screen to be displayed before login, within an area included in a system information screen to be displayed after login. For example, the controller 100 may hide a machine information area in a system information screen to be displayed before login.

By performing processing (1) among the pieces of processing described above, the controller 100 can hide, before the user logs in, a part of items included in a system information screen to be displayed after the user logs in. Also, by performing processing (2) or (5) among the pieces of processing described above, the controller 100 can display a notification related to an item included in a system information screen before the user logs in, and display detailed information on an item included in the system information screen after the user logs in. Also, by performing processing (4) among the pieces of processing described above, the controller 100 can display, before the user logs in, a part of items included in a system information screen to be displayed after the user logs in.

Note that, in a case where a portion where a content different from a content included in a system information screen to be displayed after login is selected on a system information screen to be displayed before login, the controller 100 may display a login screen. This allows the controller 100 to prompt the user to log in, and allows the user to check a changed content.

2.3 Operation Example

Figure 18A:
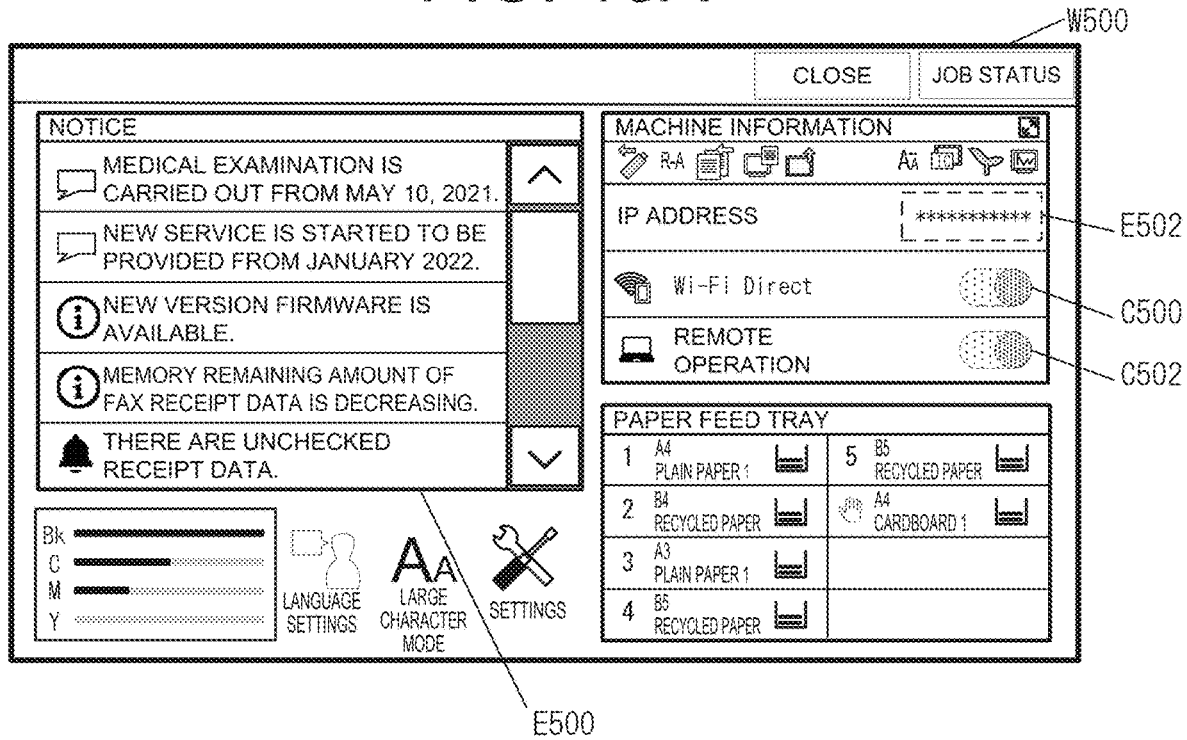
FIGS. 18A and 18B are diagrams illustrating an operation example according to the second embodiment.
Figure 18B:
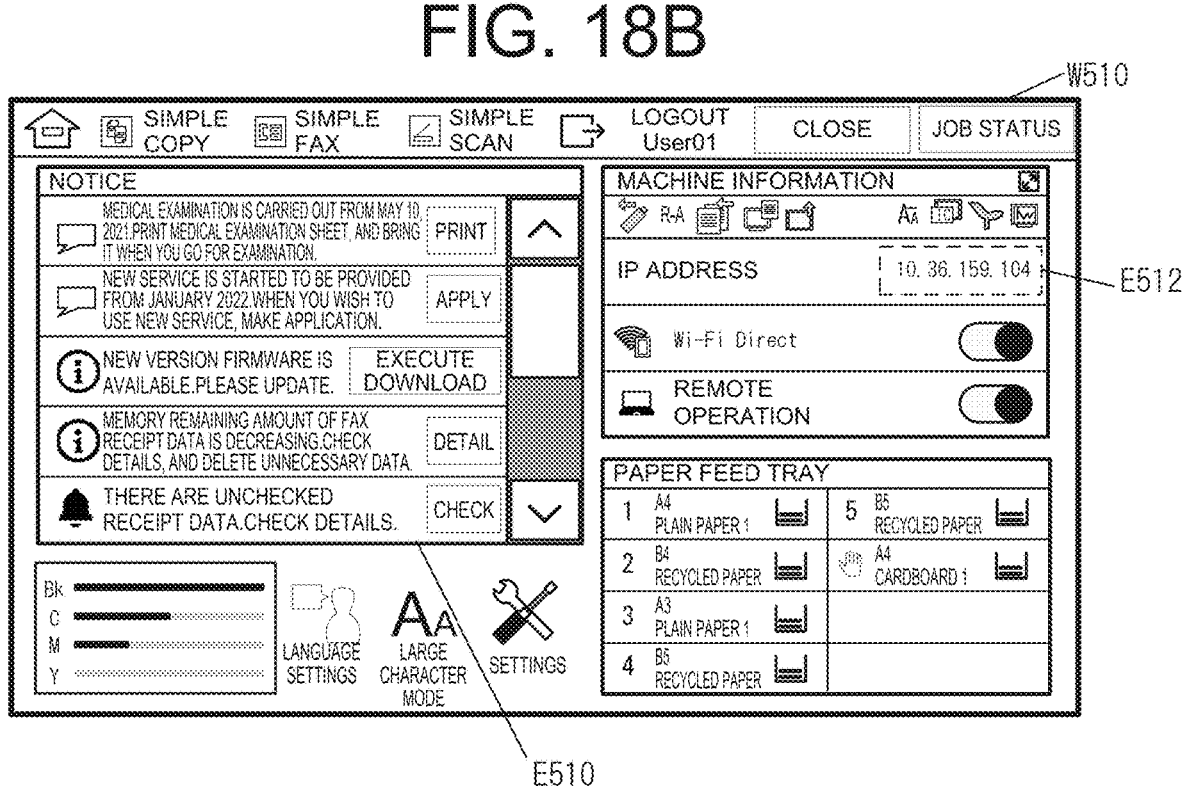

Next, an operation example according to the present embodiment is described. FIG. 18A is a diagram illustrating a screen example of a system information screen W500 to be displayed before login, and FIG. 18B is a diagram illustrating a screen example of a system information screen W510 to be displayed after login.

A pre-login message is displayed in an area E500 (notice area) included in the system information screen W500. On the other hand, a post-login message is displayed in an area E510 (notice area) included in the system information screen W510. In this way, a content of a message to be displayed before and after login can be changed in the present embodiment.

In addition, regarding an area E502 included in the system information screen W500, an IP address of the image forming apparatus 10 is displayed, as illustrated in an area E512 on the system information screen W510 after login. However, before login, the IP address is hidden, as illustrated in the area E502. The hiding method may be a method of masking a text, or may be a method of hiding a text.

In addition, a slide switch C500 and a slide switch C502 included in the system information screen W500 are displayed (disabled) in a gray out manner. Therefore, in the example in FIG. 18A, it is not possible to change settings of Wi-Fi Direct, and change settings of a remote operation before login. This allows the user to recognize that login is required, in a case where settings of Wi-Fi Direct, and settings of a remote operation are changed.

Figure 19A:
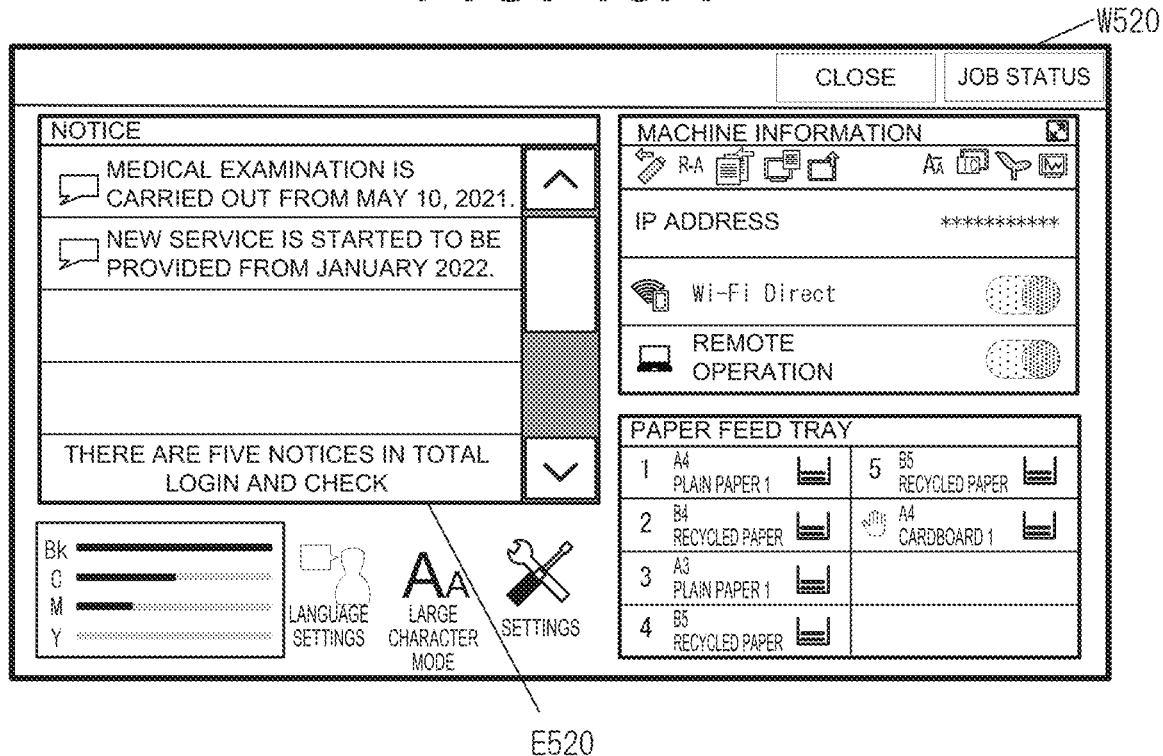
FIGS. 19A and 19B are diagrams illuustrillustrating an operation example according to the second embodiment.

FIG. 19A is another example of a system information screen W520 to be displayed before login. As illustrated in a notice area E520 in FIG. 19A, regarding the system information screen W520 to be displayed before login, only a message of a content that can be handled by the user before login may be displayed in a notice area. Further, the total number of messages may also be displayed, or an explanation that a login is required to check all messages may be displayed.

Figure 19B:
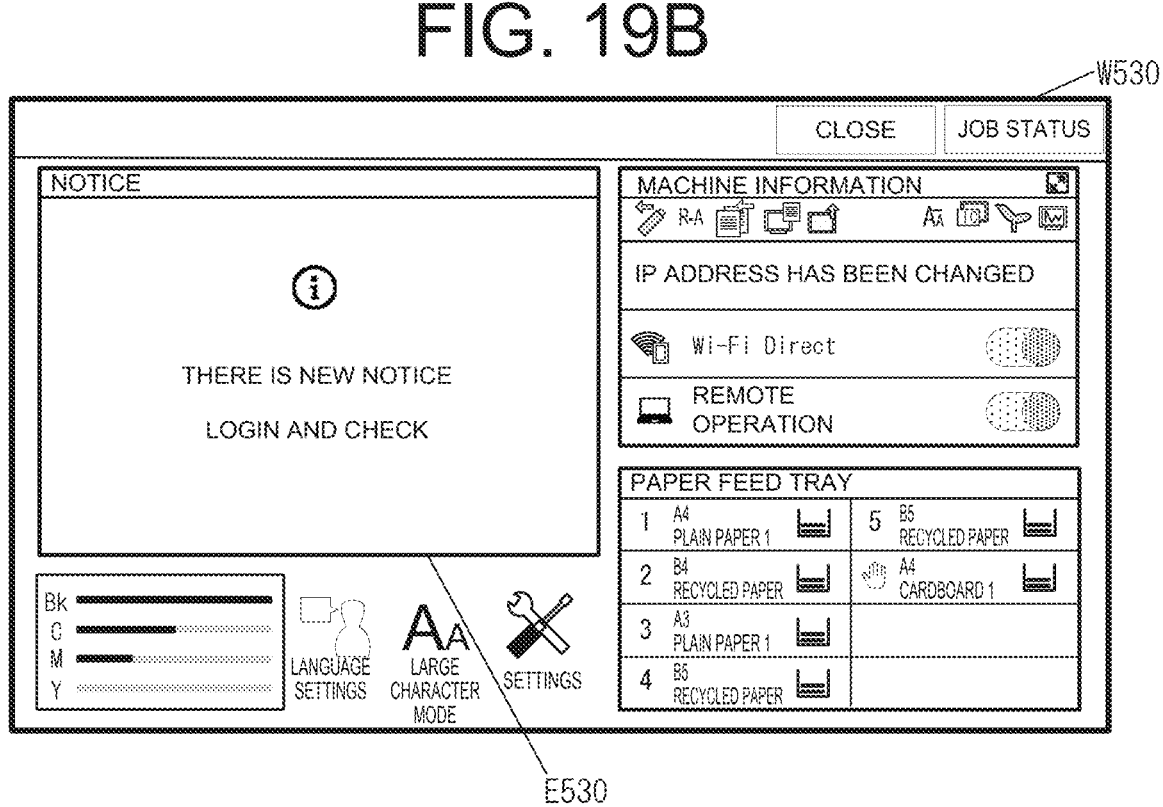

FIG. 19B is another example of a system information screen W530 to be displayed before login. As illustrated in a notice area E530 in FIG. 19B, regarding the system information screen W530 to be displayed before login, only information indicating presence or absence of a notice may be displayed in a notice area.

Figure 20A:
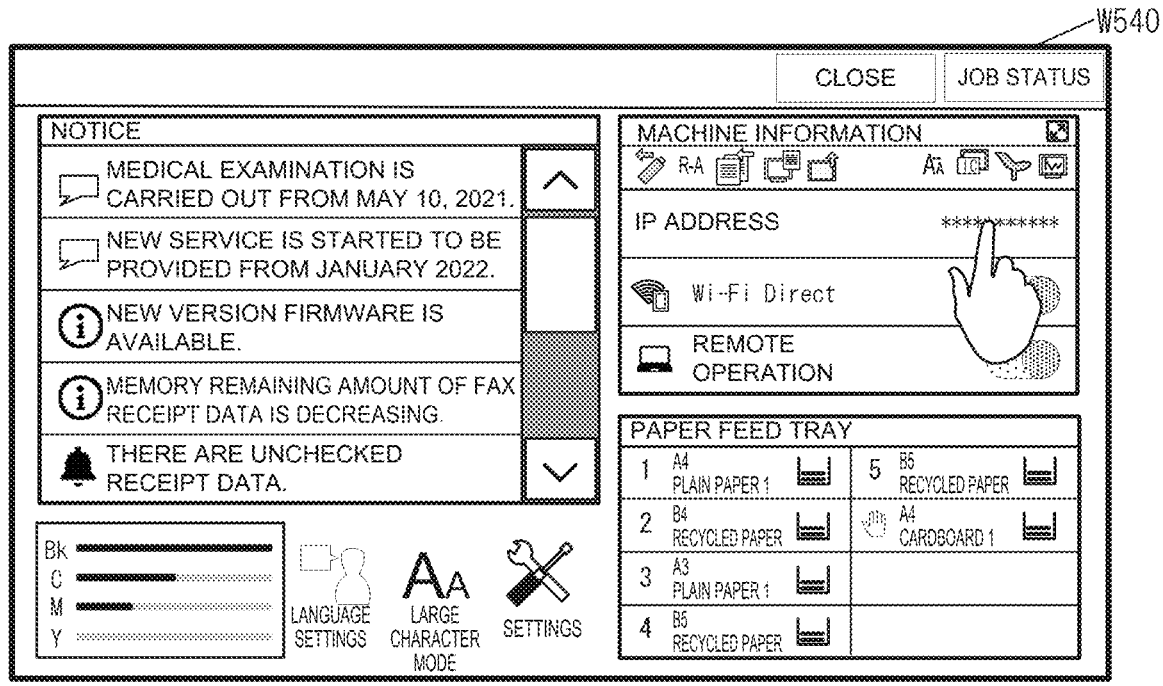
FIGS. 20A and 20B are diagrams illustrating an operation example according to the second embodiment.
Figure 20B:
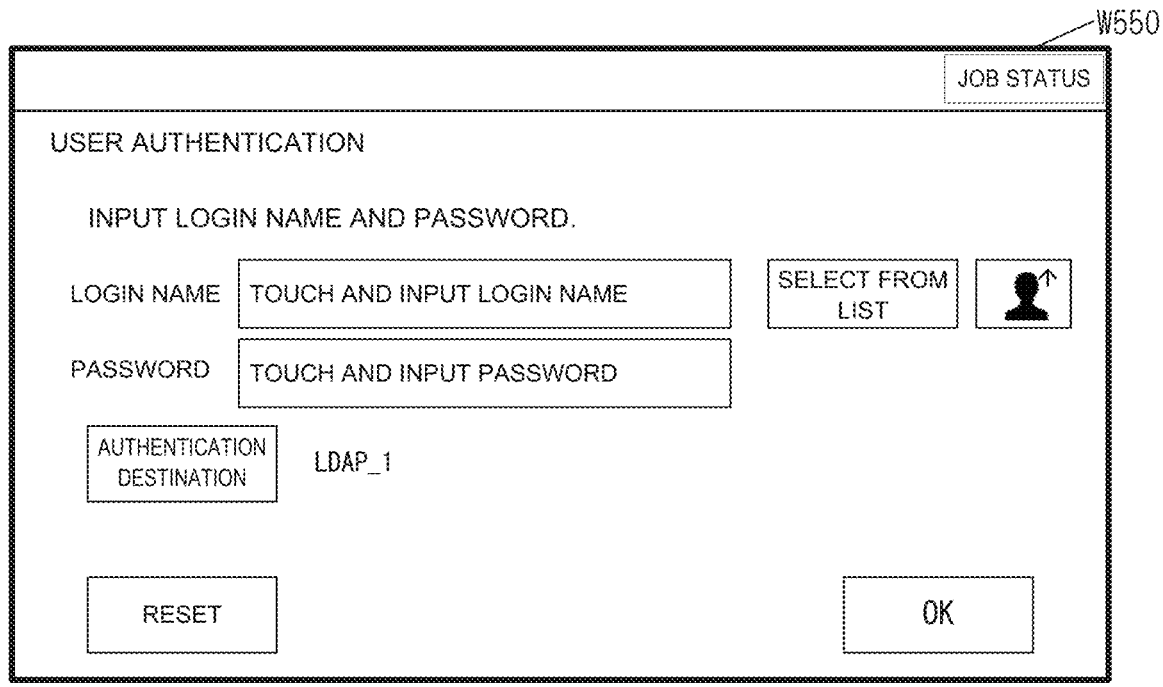

FIG. 20A is a diagram illustrating a case where, on a system information screen W540 to be displayed before login, a position where information different from information included in a system information screen to be displayed after login is displayed is selected. FIG. 20A illustrates a state that a position where a masked IP address is displayed is selected. In addition, after a selecting operation has been performed, the system information screen W540 to be displayed before login is switched to a login screen W550 illustrated in FIG. 20B. This allows the user to intuitively know that he/she is required to perform a login operation, when he/she desires to check information to be displayed after login.

Note that, the above description has been made based on a premise that a message to be displayed before/after login is changed by including a message to be displayed before login, and a message to be displayed after login. However, a method of changing message display before/after login may be another method. For example, as described in the first embodiment, message information may include one message, and in a case where the message is displayed before login, the controller 100 may display a first sentence of the message, or may display only a predetermined number of characters from a leading portion.

In a case where display permission of a system information screen before login is "ON", the controller 100 may not allow the system information screen to be displayed before the user logs in, and when a login operation by the user is performed, and a login has failed, the controller 100 may allow the system information screen to be displayed. At this occasion, the controller 100 may display, on a system information screen to be displayed in a case where a login has failed, a part of items on a system information screen to be displayed after login, after hiding the items. The controller 100 may also disable the system information screen to be displayed again after a predetermined period of time has elapsed since the user has performed an input operation last time.

In this way, in a case where a screen to be displayed when a login is completed, and a predetermined display operations performed is displayed before login, the image forming apparatus according to the present embodiment can make information included in the screen to be differentiated from that on a screen to be displayed after login. For example, the image forming apparatus according to the present embodiment can achieve information display in consideration of security and the like by hiding a part of information to be displayed before login.

3. Third Embodiment

Next, a third embodiment is described. The third embodiment is an embodiment in which, in the first embodiment, a part of information included in a system information screen is displayed before login, even in a case where a screen transition mode is a security first priority mode or a security priority mode. Specifically, the present embodiment is an embodiment in which information that should be notified to the user regardless of a login status of the user, and information that does not cause a security problem even being displayed before login is displayed.

Figure 10:
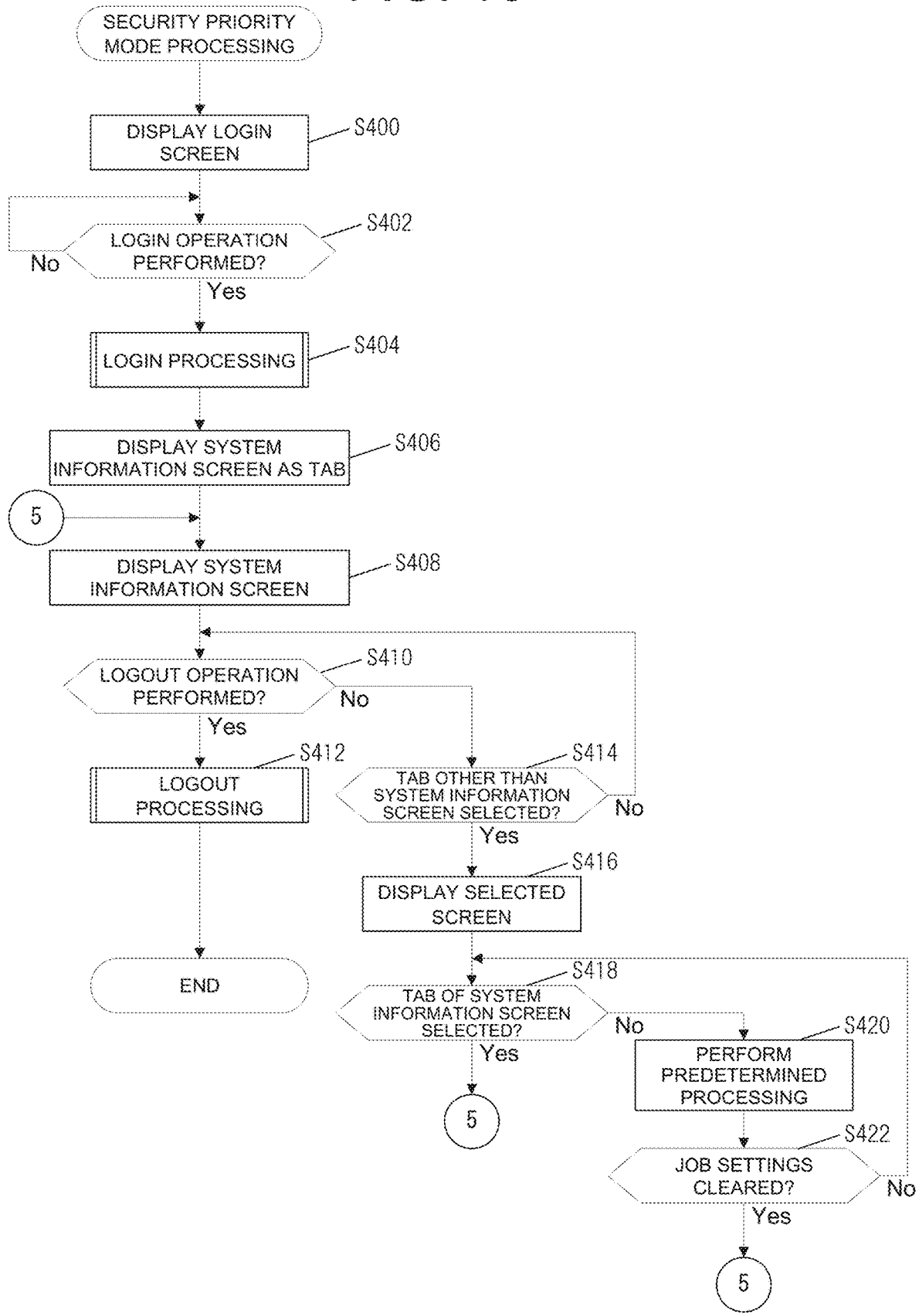
FIG. 10 is a flowchart illustrating a flow of security priority mode processing according to the first embodiment.

In the present embodiment, a part of pieces of information to be displayed on a system information screen is displayed on a login screen to be displayed in step S400 in FIG. 10 or step S500 in FIG. 11. For example, a controller 100 displays the following information on a login screen.

(1) Error Information, Paper Feed Tray Information, and a Toner Remaining Amount The controller 100 displays, on a login screen, error information (e.g., a message indicating a content of an error of an image forming apparatus 10), information on a paper feed tray, and information on a toner remaining amount.

(2) Information Indicating that a Status (Settings) has been Changed from a Previous Login The controller 100 displays information indicating that settings or a status has been changed, in a case where settings or a status has been changed at a previous login time (last login time) regarding a part of pieces of information (e.g., setting information) that are hidden before login. For example, in a case where the IP address of the image forming apparatus 10 has been changed, the controller 100 displays a text indicating that "the IP address has been changed". In this case, the controller 100 may determine whether information indicating that settings or a status has been changed is to be displayed, or a display content by performing processing similar to the processing described in the second embodiment in which alternative information for confidential information is displayed.

(3) Presence or Absence of a Notice

The controller 100 displays information indicating presence or absence of a notice (e.g., either one of texts indicating that "a notice is available" and "a notice is not available") by performing processing similar to the processing described in the second embodiment in which only presence or absence of a notice is displayed in a notice area.

Figure 21:
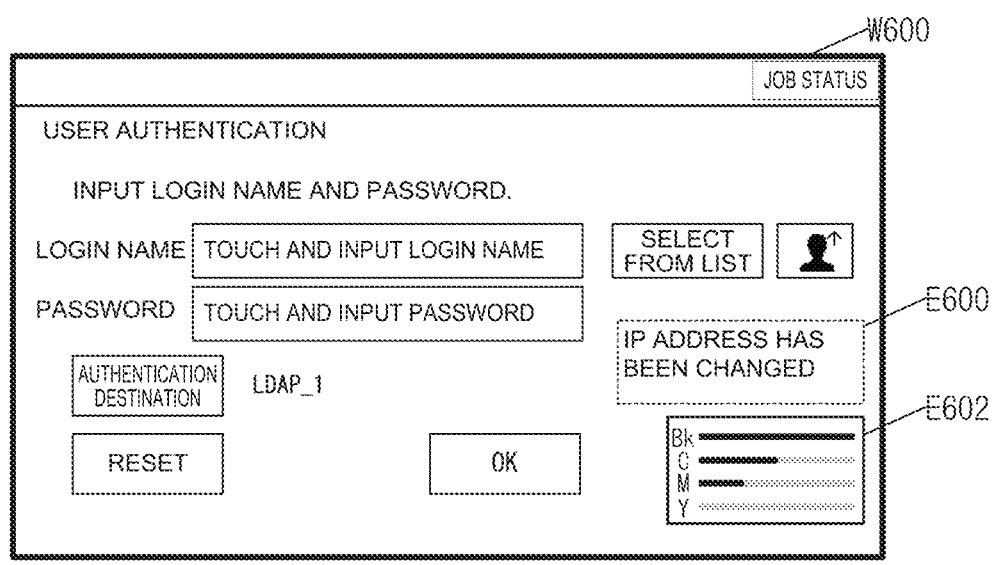
FIG. 21 is a diagram illustrating a screen example of a login screen according to a third embodiment.

FIG. 21 is a diagram illustrating a screen example of a login screen W600 according to the present embodiment. On the login screen W600, for example, information indicating that a status (settings) has been changed from a previous login time "the IP address has been changed") is displayed, as illustrated in an area E600, or a toner remaining amount is displayed, as illustrated in an area E602. This allows the user to recognize, before login, a part of pieces of information to be displayed on a system information screen without having to perform a login operation.

Note that, as described above, information to be displayed regardless of a login status, such as error information, paper feed tray information, and a toner remaining amount, may be included and displayed in a login screen, or may be included and displayed in a system information screen (simplified system information screen) before login, independently of a login screen. In this case, the controller 100 may include and display, on a login screen, a button for displaying a simplified system information screen, and in a case where the button is selected, a simplified system information screen may be displayed on a displayer 140.

In this way, the image forming apparatus according to the present embodiment can display, before login, a part of pieces of information included in a screen to be displayed when a login is completed, and a predetermined display operation is performed, thereby improving user convenience, while taking security and other factors into consideration.

4. Fourth Embodiment

Next, a fourth embodiment is described. The fourth embodiment is an embodiment in which, in addition to the processing in the first embodiment, processing of changing settings of priority display of a system information screen is performed according to a usage status of a user (call frequency of a system information screen). The present embodiment is an embodiment in which FIG. 2 in the first embodiment is replaced by FIG. 22, and FIG. 3 in the first embodiment is replaced by FIG. 23. Note that, the same functional unit is denoted by the same reference numeral, and description thereof is omitted.

4.1 Functional Configuration

Figure 22:
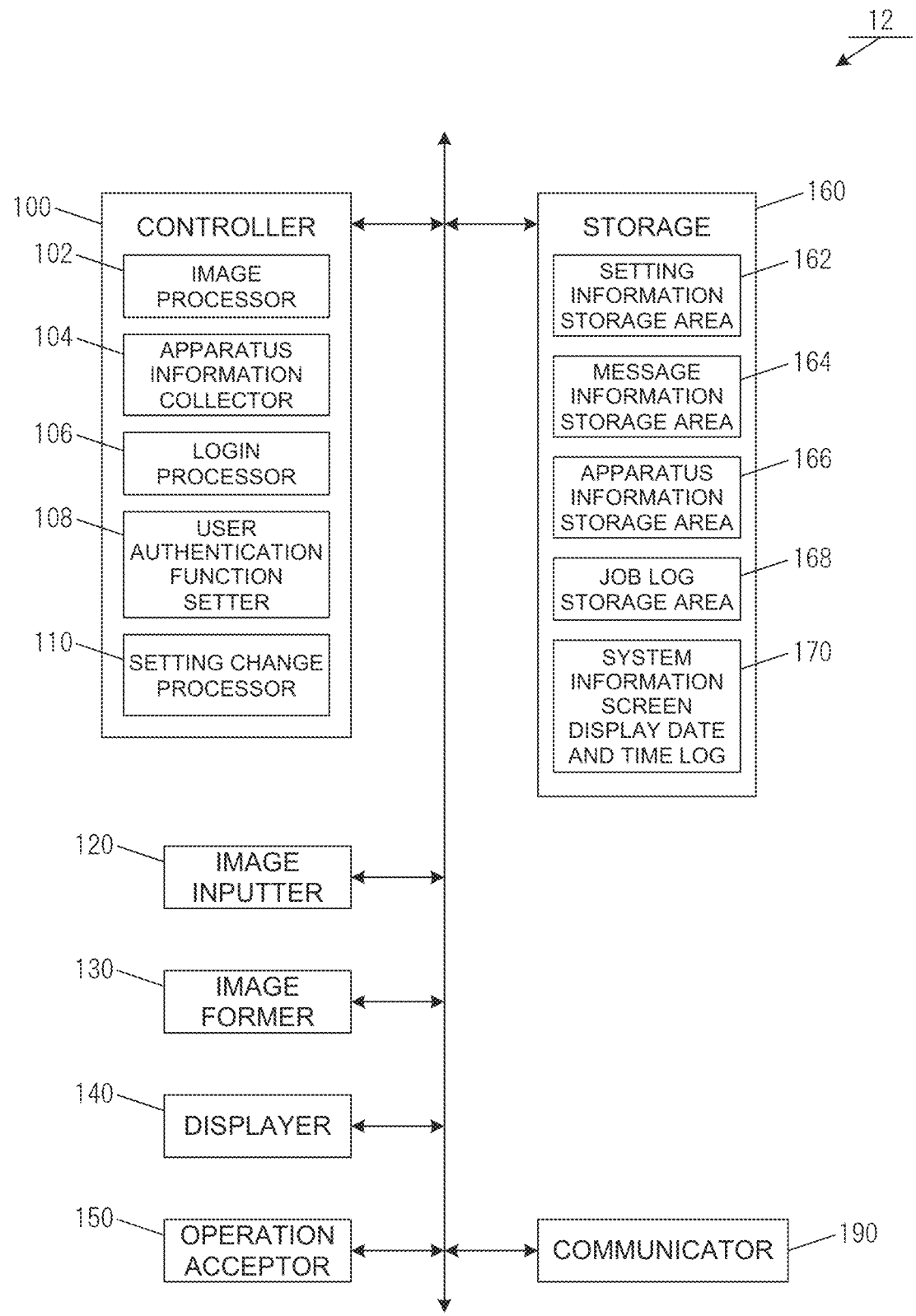
FIG. 22 is a diagram illustrating a functional configuration of an image forming apparatus according to a fourth embodiment.

FIG. 22 is a diagram illustrating a functional configuration of an image forming apparatus 12 according to the present embodiment. Compared to the image forming apparatus 10 illustrated in FIG. 2, the image forming apparatus 12 is different in a point that a controller 100 has a function as a setting change processor 110, and a storage 160 stores a system information screen display date and time log 170.

The setting change processor 110 performs processing (setting change processing) of changing settings of priority display of a system information screen according to a call frequency of a system information screen by the user. The setting change processing is described later.

The system information screen display date and time log 170 is information that stores a date and time when a system information screen has been displayed by a user operation. The system information screen display date and time log 170 is data including information on a date and time equal to or more than zero, and is text data in which a date and time are expressed as comma-separated data, for example, "Oct. 1, 2021, 12:30, Oct. 1, 2021, 14:21". Note that, the system information screen display date and time log 170 may be in a format that can store a plurality of dates and times when a system information screen has been displayed, and, for example, may be a list of dates and times.

In addition, in the present embodiment, as illustrated in D700 in FIG. 23, as setting information, a setting value (e.g., "twenty times or more per week") for a switching threshold value is stored as a threshold value to be used to determine whether to switch a setting value for priority display of a system information screen.

4.2 Flow of Processing 4.2.1. Convenience Priority Mode Processing

The controller 100 stores, in the system information screen display date and time log 170, a date and time when the convenience priority mode processing illustrated in FIG. 9 has been performed in step S308 and step S322. Specifically, in a case where the controller 100 displays a system information screen by a user operation, the controller 100 stores a date and time of the display.

4.2.2 Security First Priority Mode Processing

The controller 100 stores, in the system information screen display date and time log 170, a date and time when the security first priority mode processing illustrated in FIG. 11 has been performed in step S514. Specifically, in a case where the controller 100 displays a system information screen by a user operation, the controller 100 stores a date and time of the display.

4.2.3 Setting Change Processing

Figure 24:
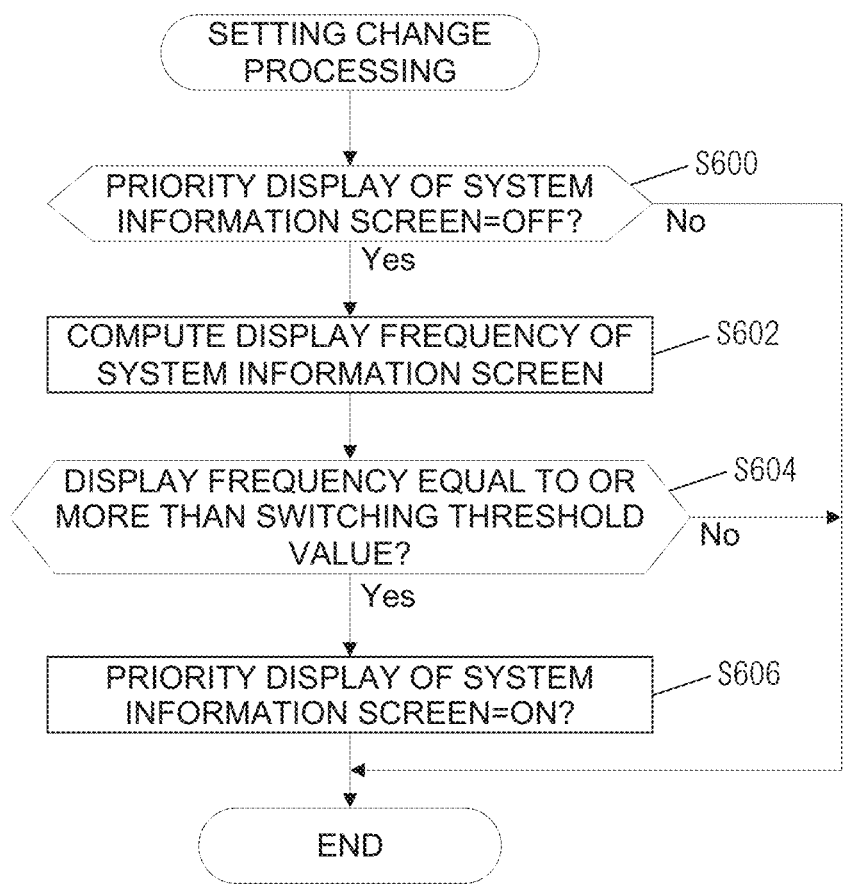
FIG. 24 is a flowchart of a flow of setting change processing according to the fourth embodiment.

Referring to FIG. 24, a flow of setting change processing to be performed by the setting change processor 110 is described. The setting change processing may be performed when a system information screen is displayed by a user operation, may be performed at a predetermined timing, or may be periodically performed.

First, the setting change processor 110 determines whether a setting value for priority display of a system information screen is "OFF" (step S600). The case that a setting value for priority display of a system information screen is "OFF" is a case in which the screen transition mode is the convenience priority mode or the security first priority mode.

The setting change processor 110 terminates the setting change processing, when the setting value for priority display of a system information screen is "ON" (step S600; No). On the other hand, in a case where the setting value for priority display of a system information screen is "OFF," the setting change processor 110 computes a display frequency of a system information screen (step S600; Yes→step S602).

The setting change processor 110 determines whether a display frequency computed in step S602 is equal to or more than the switching threshold value stored in the setting information (step S604).

In a case where the display frequency computed in step S602 is equal to or more than the switching threshold value stored in the setting information, the setting change processor 110 switches the setting value for priority display of a system information screen to "ON" (step S604; Yes→step S606). On the other hand, in a case where the display frequency computed in step S602 is less than the switching threshold value stored in the setting information, the setting change processor 110 skips the processing in step S606 (step S604; No).

The above processing switches a setting value for priority display of a system information screen according to a display frequency of the system information screen. This allows a screen transition mode to automatically shift from the security first priority mode to the security priority mode, or from the convenience priority mode to the convenience first priority mode.

In this way, the image forming apparatus according to the present embodiment can automatically switch settings pertaining to display of a screen to be displayed when a login is completed, and a predetermined display operation is performed according to an operational status of the user, thereby improving user convenience.

5. Fifth Embodiment

Next, a fifth embodiment is described. The present embodiment is an embodiment, in which, in the first embodiment, in a case where display permission of a system information screen before login is "ON", information on the system information screen is displayed on a login screen.

Figure 25:
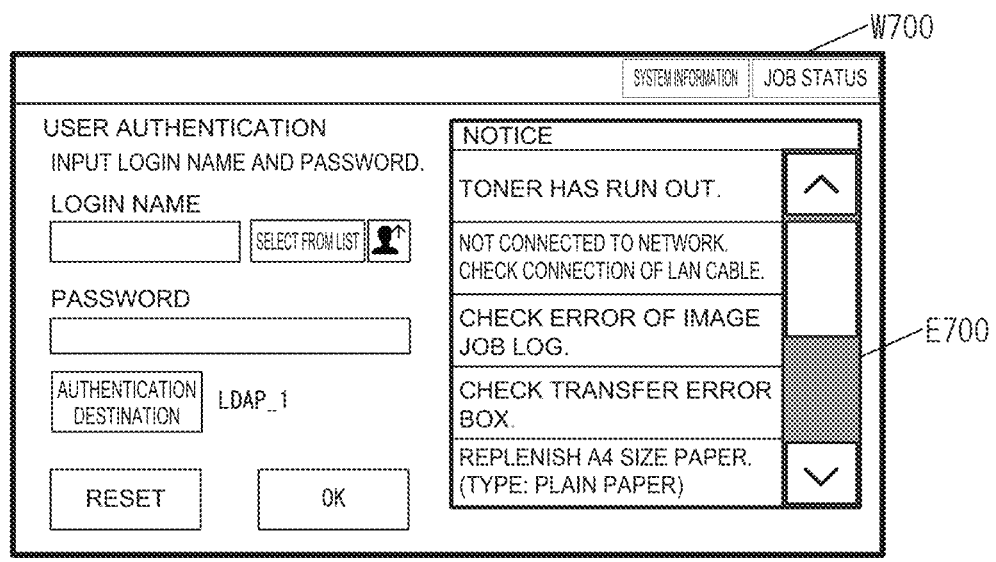
FIG. 25 is a diagram illustrating a screen example of a login screen according to a fifth embodiment.

In the present embodiment, in step S302 of the convenience priority mode processing in FIG. 9, a controller 100 displays, as a login screen, a screen including information on a system information screen. For example, as illustrated in FIG. 25, the controller 100 displays, as a login screen W700, an area E700 that displays a message, along with an input field and the like for inputting authentication information. This allows the user to recognize a content of a message stored in an image forming apparatus 10 without having to switch a login screen to a system information screen.

Note that, the login screen illustrated in FIG. 25 is an example, and information on a toner remaining amount, and information on a paper feed tray may be displayed, or error information and setting information may be displayed on a login screen. The controller 100 may also display, as a login screen, a screen including an input field and the like for authentication information may be displayed on a system information screen.

In this way, the image forming apparatus according to the present embodiment allows the user to skip an operation of switching a screen.

6. Sixth Embodiment

Next, a sixth embodiment is described. The present embodiment is an embodiment, in which, in addition to the processing described in the first embodiment, processing of preferentially displaying a system display screen is performed, even in a case where a user authentication function is disabled.

A flow of processing of an image forming apparatus 10 according to the present embodiment is described with reference to FIG. 26. First, a controller 100 determines whether a user authentication function is disabled (step S700). In a case where the user authentication function is enabled, the controller 100 performs the same processing as the processing described in the first embodiment (step S700; No). Specifically, the controller 100 displays a login screen on a displayer 140. Also, in a case where a login operation is performed, a login processor 106 performs login processing.

On the other hand, in a case where the user authentication function is disabled, the controller 100 skips processing related to a login. In this case, the controller 100 skips processing of displaying a login screen on the displayer 140. Thus, the login processor 106 does not perform login processing.

Subsequently, the controller 100 determines whether a setting value for priority display of a system information screen is "ON" (step S700; Yes→step S702). In a case where the setting value for priority display of a system information screen is "ON", the controller 100 displays a system information screen, as an initial screen (step S702; Yes→step S704). On the other hand, in a case where the setting value for priority display of a system information screen is "OFF," the controller 100 displays a default display screen, as an initial screen (step S702; No→step S706). In this case, a system information screen is displayed, in a case where an operation of displaying a system information screen is performed ley the user on a default display screen.

Subsequently, the controller 100 determines whether a finishing operation has been performed (step S708). In a case where the finishing operation has been performed, the controller 100 terminates the processing illustrated. In FIG. 26 (step S708; Yes). On the other hand, in a case where the finishing operation has not been performed, the controller 100 returns to step S700 (step S708; No→step S700).

The above processing enables the controller 100 to switch between displaying a system information screen, as an initial screen, and displaying a system information screen in a case where a predetermined operation is performed on a default display screen according to a setting value for priority display of a system information screen.

In this way, even when user authentication is disabled, the image forming apparatus according to the present embodiment can preferentially display a screen that cannot be displayed until a predetermined display operation is performed, based on settings indicating whether the screen is preferentially displayed. This enables the image forming apparatus according to the present embodiment to appropriately display a screen that cannot be displayed until a login is completed, and a predetermined display operation is performed according to settings pertaining to the screen, and settings as to whether to enable or disable a user authentication function, depending on an operational status of the user.

7. Modification Example

The present disclosure is not limited to the above-described embodiments, and various changes are available. Specifically, embodiments to be acquired by appropriately combining modified technical means within a range that does not depart from the gist of the present disclosure are also included in the technical scope of the present disclosure.

Although some of the above-described embodiments are described separately for convenience of explanation, it is needless to say that such embodiments may be combined and implemented within a technically allowable range.

In addition, a program operating in each device in the embodiments is a program (a program causing a computer to function) that controls a CPU or the like in such a way as to achieve functions of the above-described embodiments. Further, information to be handled by these devices is temporarily stored in a temporary storage device (e.g., a RAM) at a time of processing, and thereafter, is stored in a storage device such as various read only memories (ROMs), and HDDs, and is read and conected/written by the CPU as necessary.

Herein, a recording medium for storing the program may be any of a semiconductor medium (e.g., a ROM, a non-volatile memory card, and the like), an optical recording medium/magneto-optical recording medium (e.g., a digital versatile disc (DVD), a magneto optical disc (MO), a mini disc (MD), a compact disc (CD), a Blu-ray (registered trademark) Disc (BD), and the like), a magnetic recording medium (e.g., a magnetic tape, a flexible disk, and the like), and the like. In addition, not only functions of the above-described embodiments are achieved by executing a loaded program, but also functions of the present disclosure may be achieved by processing the program jointly with an operating system, other application program, or the like, based on an instruction of the program.

Further, in a case of distributing the program in the market, the program can be stored in a portable recording medium and distributed, or can be transferred to a server computer connected via a network such as the Internet. In this case, it is needless to say that a storage device of the server computer is also included in the present disclosure.

What is claimed is:

1. An image forming apparatus comprising:
a displayer, one or more processors, and an image former, wherein
the one or more processors set a screen, to be displayed on the displayer, as an initial screen,
the one or more processors further make settings as to whether a specific screen for displaying a plurality of items is displayed on the displayer in preference to the initial screen, each of the plurality of items corresponding to apparatus information including information regarding an operational status of the image forming apparatus, the information regarding the operational status including information regarding an IP address,
in a case that the settings are made in which the specific screen is displayed on the displayer in preference to the initial screen, the one or more processors further display the specific screen on the displayer in preference to the initial screen,
the one or more processors further perform login processing by a user, and
the one or more processors further display, before a user login, the specific screen with the information regarding the IP address being hidden, and display, after the user login, the specific screen including the information regarding the IP address being displayed.

2. The image forming apparatus according to claim 1, wherein
the one or more processors further make settings as to whether the login processing is enabled,
in a case that the login processing is set to be enabled, the one or more processors further enable settings of permitting a display of the specific screen before the user logs in, and
in a case that the settings of permitting the display of the specific screen are made, the one or more processors further display the specific screen on the displayer based on an operation of requesting the display of the specific screen before the user logs in.

3. The image forming apparatus according to claim 2, wherein
the one or more processors further
display a notification related to an item, among the plurality of items, included in the specific screen before the user logs in, and detailed information related to the item included in the specific screen after the user logs in.

4. The image forming apparatus according to claim 2, wherein
the one or more processors further display at least a part of the plurality of items included in the specific screen before the user logs in.

5. The image forming apparatus according to claim 2, wherein
the specific screen includes an item, among the plurality of items, for making settings related to an operation of the image forming apparatus, and
the user is prohibited from changing the settings related to the operation of the image forming apparatus before the user logs in.

6. The image forming apparatus according to claim 2, wherein
the one or more processors further hide at least a part of the plurality of items included in the specific screen in a case that the user has failed to log in.

7. The image forming apparatus according to claim 1, wherein the one or more processors further make settings as to whether the login processing is enabled, and
in a case that the login processing is not set to be enabled, and the settings are made in which the specific screen is displayed on the displayer in preference to the initial screen, the one or more processors further display the specific screen on the displayer in preference to the initial screen.

8. The image forming apparatus according to claim 2, wherein
the one or more processors further display, in the specific screen, at least one piece of information among information related to a toner remaining amount, a paper feed tray, and an error, regardless of a login status of the user.

9. The image forming apparatus according to claim 1, wherein the information regarding the operational status of the image forming apparatus includes at least one piece of information among information related to a toner remaining amount, a paper feed tray, and an error.

10. The image forming apparatus according to claim 1, wherein the displayed specific screen further includes information regarding network communication as the information regarding the operational status of the image forming apparatus.

11. A control method for an image forming apparatus comprising:

setting a screen to be displayed as an initial screen;

making settings as to whether a specific screen for displaying a plurality of items is displayed in preference to the initial screen, each of the plurality of items corresponding to apparatus information including information regarding an operational status of the image forming apparatus, the information regarding the operational status including information regarding an IP address;

displaying, in a case that the settings are made to display the specific screen in preference to the initial screen, the specific screen in preference to the initial screen; and performing login processing by a user, wherein the specific screen is displayed, before a user login, with the information regarding the IP address being hidden, and is displayed, after the user login, with the information regarding the IP address being displayed.

* * * * *